(12) United States Patent
Koyama et al.

(10) Patent No.: US 9,327,720 B2
(45) Date of Patent: May 3, 2016

(54) CONTROL DEVICE FOR HYBRID VEHICLE DRIVE SYSTEM

(71) Applicant: AISIN SEIKI KABUSHIKI KAISHA, Kariya-shi (JP)

(72) Inventors: Akinori Koyama, Anjo (JP); Akira Mineno, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 613 days.

(21) Appl. No.: 13/713,428

(22) Filed: Dec. 13, 2012

(65) Prior Publication Data

US 2013/0157806 A1    Jun. 20, 2013

(30) Foreign Application Priority Data

Dec. 16, 2011   (JP) ................. 2011-275328

(51) Int. Cl.
| | | |
|---|---|---|
| B60W 20/00 | (2006.01) | |
| B60W 10/02 | (2006.01) | |
| B60W 10/06 | (2006.01) | |
| B60W 10/08 | (2006.01) | |
| B60W 10/115 | (2012.01) | |
| B60W 30/19 | (2012.01) | |
| F16H 61/04 | (2006.01) | |
| F16H 61/00 | (2006.01) | |

(52) U.S. Cl.
CPC ............... *B60W 20/30* (2013.01); *B60W 10/02* (2013.01); *B60W 10/06* (2013.01); *B60W 10/08* (2013.01); *B60W 10/115* (2013.01); *B60W 20/00* (2013.01); *B60W 30/19* (2013.01); *F16H 61/0025* (2013.01); *F16H 61/0403* (2013.01); B60W 2710/0644 (2013.01); Y02T 10/6286 (2013.01); Y10T 477/26 (2015.01)

(58) Field of Classification Search
None
See application file for complete search history.

(56) References Cited

U.S. PATENT DOCUMENTS

2011/0174559 A1   7/2011   Saito et al.

FOREIGN PATENT DOCUMENTS

| JP | 2007-297014 A | 11/2007 |
|---|---|---|
| JP | 2008-055993 A | 3/2008 |
| JP | 2008-207643 A | 9/2008 |
| JP | 2009-208565 A | 9/2009 |
| JP | 2010-111195 A | 5/2010 |

OTHER PUBLICATIONS

Japanese Office Action 2011-275328, issued on Sep. 24, 2015 by the Japanese Patent Office, and an English Translation of the Office Action (6 pages).

*Primary Examiner* — Erin D Bishop
(74) *Attorney, Agent, or Firm* — Buchanan Ingersoll & Rooney PC

(57) ABSTRACT

A control device for hybrid vehicle drive system includes an engine rotation speed control device performing a rotation speed control of an engine so that a rotation speed of an output shaft of the engine is assumed to be equal to a next gear shift stage input shaft rotation speed when an operation amount of an accelerator pedal increases from an operation amount smaller than a first predetermined amount to an operation amount greater than a second predetermined amount, at which gear stages are switched from a current gear shift stage to a next gear shift stage whose gear ratio is greater than the current gear shift stage, within a priority determining time, a front clutch engagement commanding device, a front clutch engaging device, a release side frictional engagement element releasing device, a motor generator rotation speed control device, and an engagement side frictional engagement element engaging device.

11 Claims, 8 Drawing Sheets

CONTROL DEVICE FOR HYBRID VEHICLE DRIVE SYSTEM

CROSS REFERENCE TO RELATED APPLICATIONS

This application is based on and claims priority under 35 U.S.C.§119 to Japanese Patent Application 2011-275328, filed on Dec. 16, 2011, the entire content of which is incorporated herein by reference.

TECHNICAL FIELD

This disclosure generally relates to a control device for a hybrid vehicle drive system.

BACKGROUND DISCUSSION

Known drive systems for hybrid vehicles including an engine and a motor generator which serve as a drive source are disclosed. For example, JP2009-208565A (hereinafter referred to as Patent reference 1) discloses a hybrid vehicle including an engine, a motor generator, a first clutch (front clutch) for transmitting a torque between the engine and the motor generator and for disconnecting the engine and the motor, and a multi-stage transmission (a multi-stage automatic transmission) provided between the motor generator and driving wheels. According to the drive system for hybrid vehicle of this kind, generally, a clutch and a transmission are automatically controlled by an electronic control unit (ECU). When brakes are applied, the hybrid vehicle releases the clutch to disconnect the engine from a drive force transmitting portion including the motor generator. Thus, a regenerative braking force is applied to the vehicle by a regenerative power generation of the motor generator to reduce speed, and a loss of an electric energy by an engine friction at the time is reduced to ensure high regenerative efficiency to improve fuel efficiency.

Further, when the regenerative power generation ends, the clutch is engaged so that the vehicle travels by an output torque from the engine and a control for matching rotation speeds of a driving side and a driven side is conducted. More particularly, with a general clutch, the clutch is controlled to be a half-engaged state in a state where a difference in rotation speeds exists between the driving side and the driven side, and the difference in rotation speeds gradually reduces by a frictional sliding movement so that the driving side and the driven side synchronously rotate. According to the hybrid vehicle, because the driving sources (the engine and the motor) are positioned at opposite sides of the clutch, respectively, a significant level of shock is likely to occur when the frictional sliding movement is performed in a state where the difference in rotation speeds exists. In order to avoid the foregoing drawbacks, generally, a control for matching rotation speeds in which a rotation speed of at least one of the driving sources is controlled prior to starting an engaging operation of the clutch so that the difference in rotation speeds is assumed to be equal to or less than a threshold value (in other words, the driving sources provided at both sides of the clutch are substantially synchronously rotated) is conducted.

According to the known drive system for hybrid vehicle, for example disclosed in Patent reference 1, when a driver steps on an accelerator pedal to accelerate the vehicle in a state where the clutch is released to generate the regenerative braking force by the regenerative power generation, in many times, an engaging operation of the clutch and a downshift operation of the transmission are successively requested. In those circumstances, according to the known drive system for hybrid vehicle, following the requested order, first, the engaging operation of the clutch along with matching the rotation speeds is controlled, then successively, the downshift operation is controlled in a state where the vehicle is driven by the engine and the motor. According to the known control method, a longer time is required from starting an operation of the accelerator pedal until the vehicle starts accelerating, which gives the driver a feeling that there is a time lag.

A need thus exists for a control device for a hybrid vehicle drive system, which is not susceptible to the drawback mentioned above.

SUMMARY

In light of the foregoing, the disclosure provides a control device for hybrid vehicle drive system controlling a hybrid vehicle drive system which includes a motor generator including a rotor and a stator, the motor generator for driving a vehicle and producing an electric power when reducing speed to apply a regenerative braking force to the vehicle, a front clutch rotatably connecting the rotor and an output shaft of an engine to be selectively engageable, and a multi-stage automatic transmission having an input shaft rotatably connected to the rotor, an output shaft rotatably connected to driving wheels, and a plurality of frictional engagement elements selectively engaged and disengaged for switching a plurality of gear shift stages having gear ratios, each of which is obtained by dividing a rotation speed of the input shaft by a rotation speed of the output shaft, different from one another. The control device for hybrid vehicle drive system controls switching operations of an engaged state and a disengaged state of the front clutch and controls gear shifting operation of the multi-stage automatic transmission, which includes an engine rotation speed control device, a front clutch engagement commanding device, a front clutch engaging device, a release side frictional engagement element releasing device, a motor generator rotation speed control device, and an engagement side frictional engagement element engaging device. The engine rotation speed control device performs a rotation speed control of the engine so that a rotation speed of the output shaft of the engine is assumed to be equal to a next gear shift stage input shaft rotation speed obtained by multiplying the rotation speed of the output shaft of the multi-stage automatic transmission by a gear ratio of a next gear shift stage when an operation amount of an accelerator pedal increases from an operation amount smaller than a first predetermined amount at which the engaged state and the disengaged state of the front clutch is switched to an operation amount greater than a second predetermined amount, at which gear stages are switched from a current gear shift stage currently established by the multi-stage automatic transmission to the next gear shift stage whose gear ratio is greater than the current gear shift stage, within a priority determining time. The front clutch engagement commanding device outputs an engaging command for switching the front clutch from the disengaged state to the engaged state on the basis of a relationship between a rotation speed of the output shaft of the engine increased by the rotation speed control of the engine and a rotation speed of the rotor of the motor generator. The front clutch engaging device is configured to switch the front clutch from the disengaged state to the engaged state in accordance with the engaging command. The release side frictional engagement element releasing device is configured to disengage a release side frictional engagement element which is configured to be engaged when the current gear shift stage is established and configured to be disengaged when the next gear shift stage is established among the plurality of frictional engagement elements when the operation amount of the accelerator pedal exceeds the second predetermined amount. The motor generator rotation speed control device performs a rotation speed control of the motor generator to make a rotation speed of the rotor of the motor generator be equal to the next gear shift stage input shaft rotation speed when the release side frictional engagement element is disengaged. The engagement side frictional engagement element engaging device establishes an engaged state of an engagement side frictional engagement element which is configured to be a disengaged state when the current gear shift stage is established and is configured to be the engaged state when the next gear shift stage is established among the plurality of the frictional engagement elements for the multi-stage automatic transmission on the basis of a relationship between the rotation speed of the rotor of the motor generator increased by the rotation speed control of the motor generator and the next gearshift stage input shaft rotation speed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
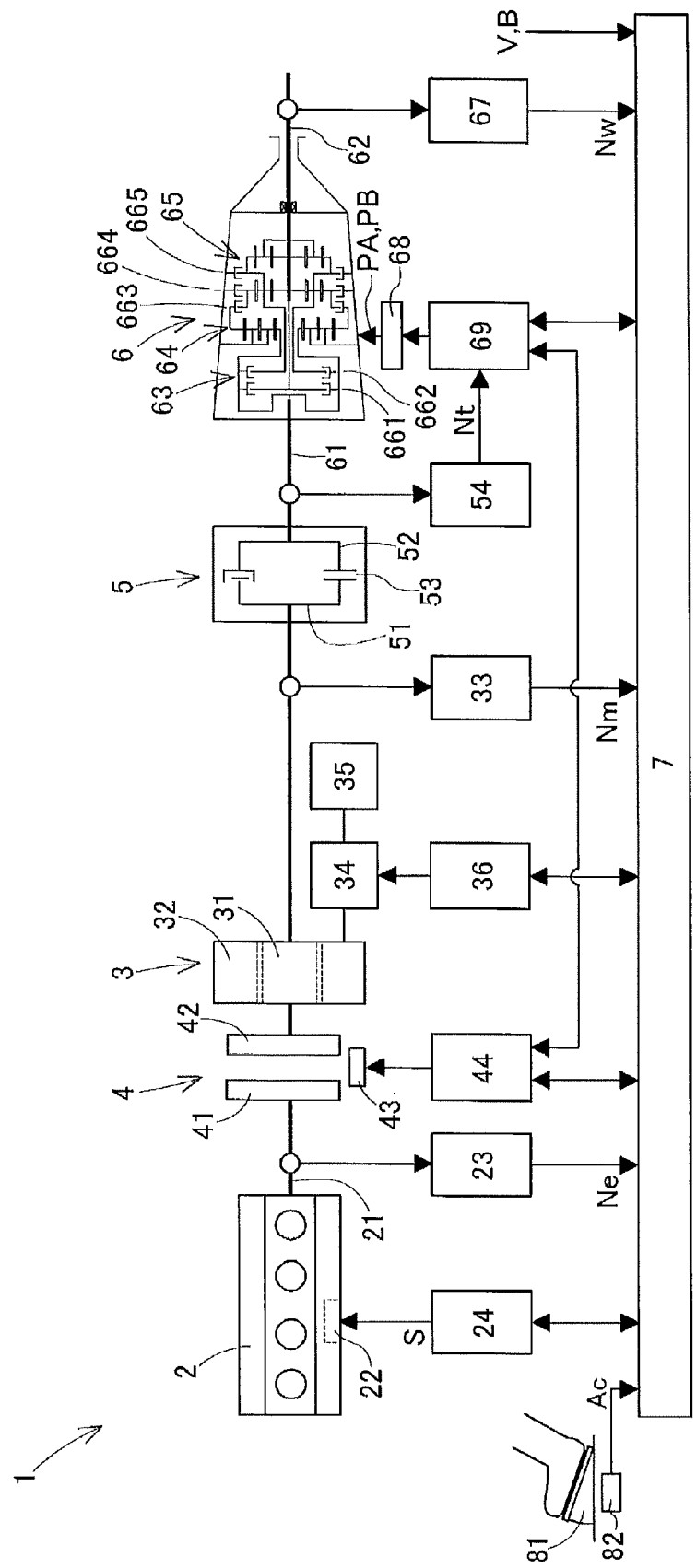
FIG. 1 is a block diagram schematically showing an overall structure of a hybrid vehicle drive system including a control device according an embodiment disclosed here.

An embodiment of a control device for a hybrid vehicle drive system will be explained with reference to FIGS. 1 to 10 as follows. In FIG. 1, solid bold lines show mechanical rotational connections for transmitting a torque between apparatuses. Thin arrowed lines in FIG. 1 show flows of controls and detection signals. A hybrid vehicle drive system 1 includes an engine 2, a motor generator 3, a front clutch 4, a torque converter 5, and a multi-stage automatic transmission 6.

Known general types and constructions, for example, a gasoline engine which uses gasoline as a fuel and a diesel engine which uses light oil, or diesel as a fuel may be applied as the engine 2. The engine 2 includes an output shaft 21, a throttle valve 22, and an engine rotation sensor 23, and is controlled by an engine control device 24. The output shaft 21 integrally rotates with a crankshaft rotated by a piston to output a torque. The throttle valve 22 is positioned in a middle of a path for introducing the air into the engine 2. An opening degree S of the throttle valve 22 is variably controlled by the engine control device 24. The engine rotation sensor 23 is positioned in the vicinity of the output shaft 21, and detects a rotation speed Ne corresponding to a rotation speed of the output shaft 21 to output a detection signal to a hybrid control device 7.

Upon receiving a command for increasing speed from the hybrid control device 7, the engine control device 24 increases an intake volume of the air by controlling the opening degree S of the throttle valve 22 to increase. Accordingly, a supply volume of a mixed air including the fuel increases to increase the engine rotation speed Ne. Further, upon receiving a command for decreasing speed from the hybrid control device 7, the engine control device 24 controls the opening degree S of the throttle valve to be smaller so that the engine rotation speed Ne reduces. The engine rotation speed Ne varies with a substantially constant rotation speed incremental gradient dNe and a constant rotation speed decremental gradient until the engine rotation speed Ne becomes to be close to a requested engine rotation speed Ner which corresponds to a control target when increasing speed and reducing speed.

The motor generator 3 including a rotor 31 and a stator 32 is configured to drive the vehicle and is configured to apply a regenerative braking force to the vehicle by generating the electric power when reducing the speed. A three-phase synchronous machine in which the stator 32 formed by winding stator windings to slots of a stator core is positioned at an outer periphery and the rotor 31 formed by embedding a permanent magnet to a rotor core is positioned at an axial center may be applied as the motor generator 3. The rotor 31 is rotatably connected to a driven side member 42 of the clutch 4 so as to integrally rotate and is rotatably connected to a pump plate 51 provided at an input side of the torque converter 5 so as to integrally rotate. A motor rotation sensor 33 is provided in the vicinity of the rotor 31. The motor rotation sensor 33 detects a motor rotation speed Nm corresponding to a rotation speed of the rotor 31 and outputs the detected signal to the hybrid control device 7. Further, the stator winding of the stator 32 is connected to an inverter device 34, and the inverter device 34 is connected to a battery 35.

A motor control device 36 is configured to control an operation of the inverter device 34 to perform a switching control of a driving mode and an electric power generating mode of the motor generator 3 and a control for the motor rotation speed Nm. Upon receiving a driving command from the hybrid control device 7, the motor control device 36 controls the inverter device 34 to supply a driving electric power to the motor generator 3 from the battery 35 and variably controls a frequency and an effective value of a driving voltage in accordance with the requested motor rotation speed Nmr which is the control target. Further, upon receiving a regenerative command from the hybrid control device 7, the motor control device 36 controls the inverter device 34 to charge the battery 35 with the regenerative electric power from the motor generator 3.

The front clutch 4 rotatably connects the rotor 31 of the motor generator 3 and the output shaft 21 of the engine 2 so that the rotor 31 and the output shaft 21 are engageable and disengageable (releasable). A wet type multiple plate friction clutch, which includes a driving side member 41 rotatably connected to the output shaft 21 of the engine 2, a driven side member 42 rotatably connected to the rotor 31, and a clutch actuator 43 configured to switch an engaging state and a disengaging (releasing) state of the driving side member 41 and the driven side member 42, may be applied as the front clutch 4. The rotation speed of the driving side member 41 constantly accords to the engine rotation speed Ne and the rotation speed of the driven side member 42 constantly accords to the motor rotation speed Nm.

A hydraulic pressure operation mechanism for switching the engagement and the disengagement (releasing) of the driving side member 41 and the driven side member 42 by moving an operation fluid using an oil pump is applied as the clutch actuator 43. A normal close type clutch is applied as the front clutch 4 which is engaged when a clutch pressure Pc serving as a hydraulic pressure of the operation fluid is not generated and is disengaged (switched to be released) when the clutch pressure Pc is generated. The front clutch 4 realizes a synchronous rotation by a frictional sliding movement by the engagement of the driving side member 41 and the driven side member 42 even when there is a rotational difference (rotation speed difference) between the driving side member 41 and the driven side member 42.

A clutch control device 44 controls a switching operation of an engaged state and a disengaged state (released state) of the clutch 4 by controlling the clutch actuator 43 in response to a clutch engaging command and a clutch disengaging command (clutch releasing command) from the hybrid control device 7. The clutch control device 44 outputs a command for removing the clutch pressure Pc to the clutch actuator 43 upon receiving the clutch engaging command. At the clutch actuator 43, the operation fluid moves to remove the clutch pressure Pc, the driving side member 41 and the driven side member 42 are engaged to start transmitting a torque by a frictional sliding movement of the driving side member 41 and the driven side member 42, and eventually, the driving side member 41 and the driven side member 42 are connected by a frictional force so as to synchronously rotate.

Because of a dimensional tolerance in structure and a moving time of the operation fluid in the engaging operation of the front clutch 4, a time lag is generated from the clutch pressure Tc is removed until a torque transmission is started by the engagement. A time required from the generation of the clutch engaging command until the torque transmission is started is defined as a time Tc for execution of engagement. Because the time Tc for execution of engagement fluctuates depending on, for example, the temperature of the operation fluid, a maximum time Tc-max for execution of engagement and a minimum time Tc-min for execution of engagement which serve as a maximum value and a minimum value of a fluctuation range, respectively, are obtained in advance and are memorized in the clutch control device 44.

The torque converter 5 connects a rotation of the motor 3 and the multi-stage automatic transmission 6 to variably adjust a torque amount to be transmitted and the rotation speed. The torque converter 5 includes the pump plate 51 rotatably connected to the rotor 31 of the motor 3 and a turbine plate 52 rotatably connected to an input shaft 61 of the multi-stage automatic transmission 6. The torque converter 5 includes a lock-up clutch 53 which establishes a lock-up state where a synchronous rotation is maintained by mechanically connecting the pump plate 51 and the turbine plate 52. Further, a turbine rotation sensor 54 is positioned in the vicinity of the output side of the turbine plate 52 and the turbine rotation sensor 54 detects a turbine rotation speed Nt to output the detected signal to a transmission control device 69.

According to the embodiment, the lock-up state of the torque converter 5 is substantially maintained, and the turbine rotation speed Nt substantially accords to the motor rotation speed Nm. Thus, the torque converter 5 may be omitted, and the hybrid vehicle drive system 1 may include a structure in which the rotor 31 of the motor 3 and the input shaft 61 of the multi-stage automatic transmission 6 are directly connected.

The multi-stage automatic transmission 6 is a device for selectively switching plural gear shift stages having different gear ratios. The input shaft 61 of the multi-stage automatic transmission 6 is rotatably connected to the rotor 31 of the motor 3 via the torque converter 5. An output shaft 62 of the multi-stage automatic transmission 6 is rotatably connected to driving wheels. As shown in FIG. 1, the multi-stage automatic transmission 6 includes an input switching portion 63, a single planetary gear mechanism 64, and a dual planetary gear mechanism 65, which are arranged in the mentioned order from the input shaft 61 side. First and second frictional engagement elements 661, 662 are positioned in the input switching portion 63, a third frictional engagement element 663 for engaging the single planetary gear mechanism 64 and the dual planetary gear mechanism 65 are positioned, and fourth and fifth frictional engagement elements 664, 665 are positioned within the dual planetary gear mechanism 65. An output shaft rotation sensor 67 is provided in the vicinity of the output shaft 62, and the output shaft rotation sensor 67 detects an output shaft rotation speed Nw to output the detected signal to the hybrid control device 7.

The frictional engagement elements 661-665 independently switch the engaged states and disengaged states (released states) by a hydraulic pressure control mechanism 68 using the operation fluid. Each of the frictional engagement elements 661-665 includes a construction corresponding to a frictional clutch, and is configured to establish the engaged state when the hydraulic pressure is applied and to establish the disengaged state when no hydraulic pressure is applied. Each of the frictional engagement elements 661-665 is configured to frictionally slide in a half engaged state so as to match the rotation speeds of the input shaft 61 and the output shaft 62. An internal construction of the multi-stage automatic transmission 6 is not limited to the foregoing construction, and may be varied.

In those circumstances, the gear ratio is a value obtained by dividing a rotation speed of the input shaft 61 by a rotation speed of the output shaft 62. A greater gear ratio corresponds to a lower gear shift stage and a smaller gear ratio corresponds to a higher gear shift stage. At least a part of combinations of the engaged states and disengaged states (released states) of each of the frictional engagement elements 661-665 differs for each gear ratio. Thus, at a gear shift stage switching operation (shift operation) of the multi-stage automatic transmission 6, a release side frictional engagement element 66A (disengagement side frictional engagement element 66A) switching from the engaged state to the disengaged state, an engagement side frictional engagement element 66B switching from the disengaged state to the engaged state, an engagement maintaining frictional engagement element 66c maintaining the engaged state, and a release maintaining frictional engagement element 66D maintaining the disengaged state (released state) are generated. Each of the frictional engagement elements 661-665 are defined to be one of the engagement elements 66A-66D depending on combinations of a current gear shift stage before gear shifting operation and a next gear shift stage after the gear shifting operation.

When it is determined that a shift change from the current gear shift stage to another gear shift stage is necessary, the transmission control device 69 controls the hydraulic pressure control mechanism 68 to control the hydraulic pressure of each of the frictional engagement elements 661-665 to switch the gear stage to the mentioned another gear shift stage. Hereinafter, the hydraulic pressure at the release side friction engagement element 66A switching from the engaged state to the disengaged state in the gear shift operation is defined as a releasing pressure PA, and a hydraulic pressure at the engagement side frictional engagement element 66B switching from the disengaged state to the engaged state is defined as an engaging pressure PB.

The hybrid control device 7 is configured to integrally control a start, a travel, and a stop of the vehicle. The hybrid control device 7 serves as a superior control device to the engine control device 24, the motor control device 36, the clutch control device 44, and the transmission control device 69, and outputs commands to the engine control device 24, the motor control device 36, the clutch control device 44, and the transmission control device 69 (i.e., subordinate control devices 24, 36, 44, and 69), and sends and receives the necessary information. In those circumstances, a part of the information is directly sent and received between the clutch control device 44 and the transmission control device 69 without interposition of the hybrid control device 7. Further, the hybrid control device 7 obtains the information of an accelerator opening degree Ac corresponding to a relative value of the operation amount of the accelerator from an accelerator sensor 82 detecting the operation amount of an accelerator pedal 81. Further, the hybrid control device 7 obtains various information necessary for a motion control of the vehicle, for example, an operation amount B of a brake pedal and a vehicle speed V.

Because the hybrid control device 7 and the subordinate control devices 24, 36, 44, 69 cooperatively control the hybrid vehicle drive system 1, the hybrid control device 7, the engine control device 24, the motor control device 36, the clutch control device 44, and the transmission control device 69 as a whole serve as a control device. Hereinafter, the hybrid control device 7, the engine control device 24, the motor control device 36, the clutch control device 44, and the transmission control device 69 as a whole are referred to as the control device unless the explanations needs to distinguish individual control devices 7, 24, 36, 44, 69 from one another. The control device includes an engine rotation speed control means (i.e., engine rotation speed control device), a timer means (i.e., timer device), a front clutch engagement commanding means (front clutch engagement commanding device), a front clutch engaging means (i.e, front clutch engaging device), a release side frictional engagement element releasing means (i.e., release side frictional engagement element releasing device), a motor generator rotation speed control means (i.e., motor generator rotation speed control device), an engagement side frictional engagement element engaging means (i.e., engagement side frictional engagement element engaging device), and an output increasing means (i.e., output increasing device), which are mainly constructed using software components.

Figure 2A:
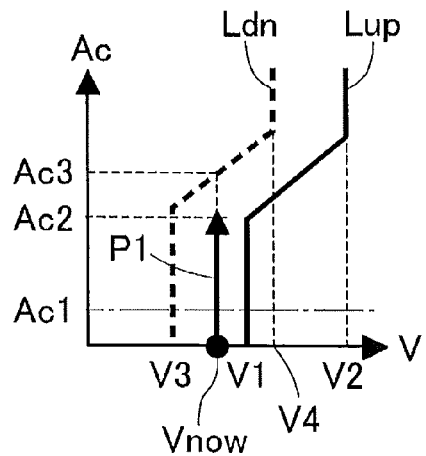
FIG. 2A shows a first operation pattern of an accelerator pedal when a clutch engaging command alone is generated.
Figure 2B:
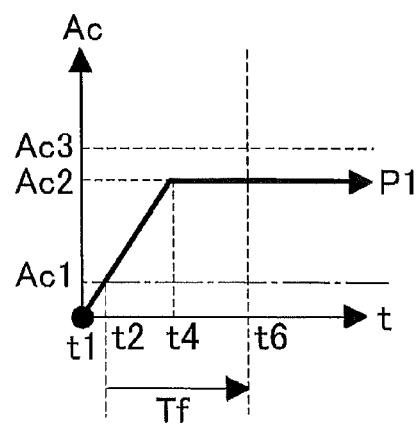
FIG. 2B shows the first operation pattern of the accelerator pedal when the clutch engaging command alone is generated.
Figure 3A:
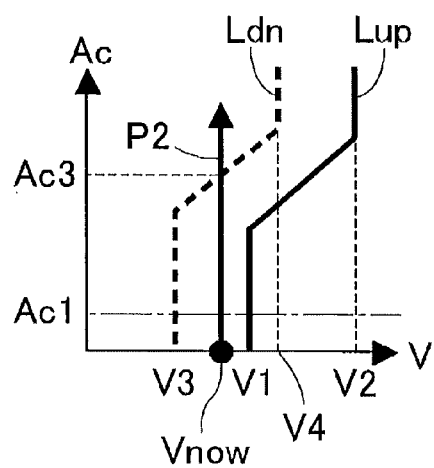
FIG. 3A shows a second operation pattern of the accelerator pedal when the clutch engaging command and a downshift operation determination are generated within a priority determining time.
Figure 3B:
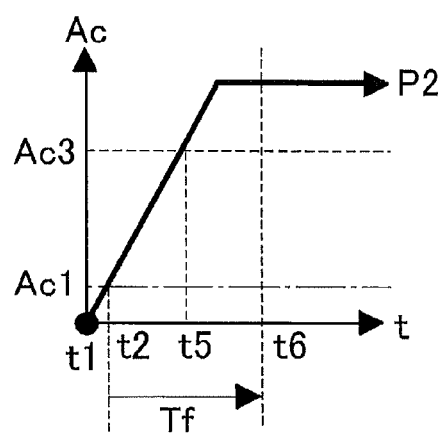
FIG. 3B shows the second operation pattern of the accelerator pedal when the clutch engaging command and the downshift operation determination are generated within the priority determining time.
Figure 4A:
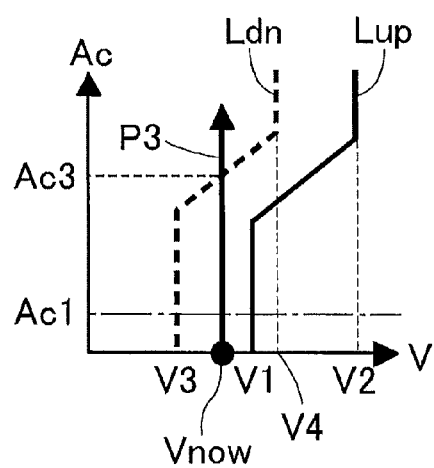
FIG. 4A shows a third operation pattern of the accelerator pedal when the downshift operation determination is generated after an elapse of the priority determining time after the generation of the clutch engaging command.
Figure 4B:
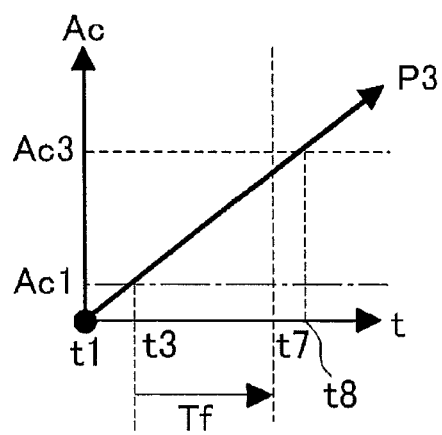
FIG. 4B shows the third operation pattern of the accelerator pedal when the downshift operation determination is generated after the elapse of the priority determining time after the generation of the clutch engaging command.

Prior to explaining functions of each functional means, an engagement command, or engaging command for the front clutch 4 and a downshift operation determination of the multi-stage automatic transmission 6 will be explained with reference to FIGS. 2A to 4B. The downshift operation determination is defined that it is determined that a gear shift operation to a lower gear shift stage compared to the current gear shift stage is to be conducted. FIGS. 2A and 2B show a first operation pattern P1 of the accelerator pedal 81 when only a clutch engaging command is generated (outputted). FIGS. 3A and 3B show a second operation pattern P2 of the accelerator pedal 81 when the clutch engaging command and the downshift operation determination are generated (outputted) within a priority determining time. FIGS. 4A and 4B show a third operation pattern P3 of the accelerator pedal 81 when the downshift operation determination is generated after an elapse of the priority determining time after the generation of the clutch engaging command. FIGS. 2A, 3A, 4A show a relationship between a downshift line Ldn and the first, second, third operation patterns P1, P2, P3, respectively, when the vehicle speed V is plotted on a horizontal axis and the accelerator opening degree Ac is plotted on a vertical axis. FIGS. 2B, 3B, 4B show a temporal change in the first, second, third operation patterns P1, P2, P3 when a time t is plotted on the horizontal axis and the accelerator opening degree Ac is plotted on the vertical axis.

The control device generates (outputs) the engagement command (engaging command) and a disengagement command (releasing command) of the front clutch 4 on the basis of a constant accelerator opening degree Ac1 (shown with a chain line in FIGS. 2A-4B) corresponding to a relatively small operation amount of the accelerator pedal 81. That is, irrespective of the levels of the vehicle speed V, when the operation amount of the accelerator pedal 81 increases exceeding the accelerator opening degree Ac1 the clutch engaging command is generated (outputted), and when the operation amount of the accelerator pedal 81 decreases so as to be below the accelerator opening degree Ac1, the clutch releasing command (clutch disengaging command) is generated (outputted). The operation amount of the accelerator pedal 81 corresponding to the accelerator opening degree Ac1 serves as a first predetermined amount.

Further, as illustrated in FIGS. 2A, 3A, 4A, the control device maintains an upshift line Lup and the downshift line Ldn with respect to switching of each of the gear shift stages. As indicated with a solid line in FIGS. 2A, 3A, 4A, the upshift line Lup is expressed in a broken line which are bent at two portions. That is, the upshift line Lup is indicated with a vertical line where the vehicle speed V corresponds to a relatively small constant value V1 in a region where the accelerator opening degree Ac is relatively small, the upshift line Lup is indicated with an inclined line at which the vehicle speed V gradually increases from the vehicle speed V1 to the vehicle speed V2 in accordance with an increment of the accelerator opening degree Ac in a region where a level of the accelerator opening degree Ac is middle, and the upshift line Lup is indicated with a vertical line where the vehicle speed V corresponds to a relatively large constant value V2 in a region where the accelerator opening degree Ac is relatively large.

On the other hand, the downshift line Ldn is expressed with a broken line which the upshift line Lup is shifted to a lower vehicle speed side as indicated with dotted lines in FIGS. 2A, 3A, 4A. That is, the downshift line Ldn is indicated with a vertical line where the vehicle speed V corresponds to a relatively small constant value V3 in a region where the accelerator opening degree Ac is relatively small, the downshift line Ldn is indicated with an inclined line at which the vehicle speed V gradually increases from the vehicle speed V3 to the vehicle speed V4 in accordance with an increment of the accelerator opening degree Ac in a region where a level of the accelerator opening degree Ac is middle, and the downshift line Ldn is indicated with a vertical line where the vehicle speed V corresponds to a relatively large constant value V4 in a region where the accelerator opening degree Ac is relatively large. For example, in the illustrations in FIGS. 2A, 3A, 4A, the vehicle speed V2 is greater than the vehicle speed V4, the vehicle speed V4 is greater than the vehicle speed V1, and the vehicle speed V1 is greater than the vehicle speed V3 (i.e., V3<V1<V4<V2).

When an operation point indicated with an intersection of the current accelerator opening degree Ac and the vehicle speed V of the vehicle in motion intersects with the upshift line Lup in accordance with a reduction of the accelerator opening degree Ac or an increase of the vehicle speed V, the control device generates (outputs) the upshift operation determination. Further, when the current operation point intersects with the downshift line Ldn in accordance with a reduction of the vehicle speed V or an increase of the accelerator opening degree Ac, the control device generates (outputs) the downshift operation determination. The operation amount of the accelerator pedal 81 corresponding to the downshift line Ldn serves as a second predetermined amount.

As widely known, an operation amount and an operation speed when operating (a driver applies) the accelerator pedal 81 varies in every operations (are different depending on operations). FIGS. 2B, 3B, 4B show three operation patterns as examples. According to the first operation pattern P1 shown in FIG. 2B, a driver starts applying the accelerator pedal 81 at time t1 and the accelerator opening degree Ac increases in accordance with an elapse of time t. At time t2, when the accelerator opening degree Ac exceeds the accelerator opening degree Ac1 corresponding to the first predetermined amount, the engaging command (engagement command) for the front clutch 4 is generated (outputted). Thereafter, at time t4, the accelerator opening degree Ac is settled (set) to a constant accelerator opening degree Ac2 and does not reach the accelerator opening degree Ac3 which corresponds to the downshift line Ldn. As shown in FIG. 2A, the accelerator opening degree Ac3 corresponds to the accelerator opening degree Ac3 at a point which intersects with the inclined line portion of the downshift line Ldn at the current vehicle speed Vnow (V3<Vnow<V4).

Further, at time t6 at which a priority determining time Tf elapses from the time t2 at which the engaging command for the front clutch 4 is generated (outputted), the accelerator opening degree Ac keeps constant accelerator opening degree Ac2 and does not change the level thereafter, which corresponds to that the operation pattern P1 in FIG. 2A does not intersect with the downshift line Ldn. In the first operation pattern P1 of the accelerator pedal 81 shown in FIG. 2B, the engaging command for the front clutch 4 alone is generated (outputted). In those circumstances, the engaging operation of the front clutch 4 is controlled alone (separately).

Further, at the second operation pattern P2 shown in FIG. 3B, the driver starts applying the accelerator pedal 81 at time t1, and the accelerator opening degree Ac increases in accordance with an elapse of time t. When the accelerator opening degree Ac exceeds the accelerator opening degree Ac1 corresponding to the first predetermined amount at time t2, the engaging command for the front clutch 4 is generated (outputted). Thereafter, at time t5, the accelerator opening degree Ac exceeds the accelerator opening degree Ac3 which corresponds to the downshift line Ldn. This corresponds to that the second operation pattern P2 shown in FIG. 3A intersects with the inclined line portion of the downshift line Ldn at the current vehicle speed Vnow, and the downshift operation determination of the multi-stage automatic transmission 6 is generated (outputted). Here, the current vehicle speed Vnow is greater than the vehicle speed V3 and less than the vehicle speed V4 (i.e., V3<Vnow<V4).

In the second operation pattern P2 of the accelerator pedal 81 shown in FIG. 3B, the downshift operation determination is generated at a timing which is before time t6 at which the priority determining time Tf elapses from the generation (output) of the engaging command for the front clutch 4 at time t2. That is, according to the second operation pattern P2 of the accelerator pedal 81 shown in FIGS. 3A and 3B, first, the engaging command for the front clutch 4 is generated, and the downshift operation determination is generated thereafter before the priority determining time Tf elapses. In those circumstances, the control device simultaneously controls the engaging operation of the front clutch 4 and the downshift operation of the multi-stage automatic transmission 6 to conduct a control in which the gear shift operation is prioritized.

Further, in FIG. 4B, the driver starts operating the accelerator pedal 81 at time t1, and the accelerator opening degree Ac moderately increases in accordance with an elapse of the time t. Thus, the accelerator opening degree Ac exceeds the accelerator opening degree Ac1 corresponding to the first predetermined amount at time t3 (shown in FIG. 3B) which is later than time t2 (shown in FIG. 2B) and the engaging command for the front clutch 4 is generated (outputted). Further, at time t7 at which the priority determining time Tf elapses from time t2 at which the engaging command for the front clutch 4 is generated (outputted), the accelerator opening degree Ac continues to increase. Thereafter, when the accelerator opening degree Ac exceeding the accelerator opening degree Ac3 corresponding to the downshift line Ldn at time t8 corresponds to the third operation pattern P3 shown in FIG. 4A intersecting with the inclined line portion of the downshift line Ldn at the current vehicle Vnow, and the downshift operation determination of the multi-stage automatic transmission 6 is generated. Here, the current vehicle Vnow is greater than the vehicle speed V3 and less than the vehicle speed V4 (i.e., V3<Vnow<V4).

In those circumstances, the downshift operation determination is generated (outputted) after the priority determining time Tf elapses from time t2 at which the engaging command for the front clutch 4 is outputted. In the third operation pattern P3 of the accelerator pedal 81 shown in FIG. 4B, the downshift operation determination is generated (outputted) after the engaging command for front clutch 4 is generated, after the priority determining time Tf elapses, and after the separate control of the front clutch 4 alone is started. In this case, the control device controls the engaging operation of the front clutch 4 alone, first, and successively, controls the downshift operation of the multi-stage automatic transmission 6 separately so that a control in which the engagement operation is prioritized is conducted.

Next, functions of each functional means of the control device will be explained hereinafter. Some functional means changes their functions depending on the operation patterns P1, P2, and P3 of the accelerator pedal 81. First, functions of each functional means when conducting the simultaneous controls in accordance with the second operation pattern P2 will be explained.

The engine rotation speed control means performs a rotation speed control of the engine 2 so that the engine rotation speed Ne is assumed to be equal to a next gear shift stage input shaft rotation speed Ni2 which is obtained by multiplying the output shaft rotation speed Nw by a gear ratio of the next gear shift stage when the operation amount of the accelerator pedal 81 increases from a level lower than the first predetermined amount to a level exceeding the second predetermined amount within the priority determining time Tf. That is, the engine rotation speed control means sets the requested engine rotation speed Ner with the next gear shift stage input shaft rotation speed Ni2 as a control target, and controls the opening degree S of the throttle valve 22 of the engine 2 to increase the engine rotation speed Ne. The control is for matching the rotation speeds of a driving side and a driven side for the next gear shift stage input shaft rotation speed Ni2 after the gear shift operation at the multi-stage automatic transmission 6, which is defined as a control in which the gear shift operation is prioritized.

The timer means times an elapsed time Tp after the operation amount of the accelerator pedal 81 exceeds the first predetermined amount. By confirming whether the downshift operation determination is generated (outputted) while comparing the degrees of the timed elapsed time Tp and the priority determining time Tf, the first to third operation patterns P1 to P3 shown in FIGS. 2A to 4B are distinguishingly reflected on the control.

The front clutch engagement commanding means outputs the engaging command (engagement command) for switching the front clutch 4 from the released (disengaged) state to the engaged state on the basis of the relationship between the motor rotation speed Nm and the engine rotations speed Ne increased by the rotation speed control of the engine 2. Further, the front clutch engagement commanding means outputs an engaging command when a ratio obtained by dividing the motor rotation speed Nm by the output shaft rotation speed Nw is equal to or higher than a predetermined ratio and when a synchronization completion estimation time Tsyn which is obtained by dividing a current rotation speed difference of the engine rotation speed Ne and the next gear shift stage input shaft rotation speed Ni2 by the rotation speed incremental gradient dNe of the engine 2 is equal to or shorter than the minimum time Tc-min for execution of engagement of the front clutch 4.

The front clutch engaging means switches the engagement states of the front clutch 4 from the released state (disengaged state) to the engaged state in response to the engaging command from the front clutch engagement commanding means. That is, the front clutch engaging means outputs a command to the clutch actuator 43 to reduce and remove the clutch pressure Pc.

The release side frictional engagement element releasing means establishes a released state of the release side frictional engagement element 66A, which is configured to be a released state (disengaged state) when the next gear shift stage is established and is configured to be an engaged state when the current gear shift stage is established, among the plural frictional engagement elements 661-665 in a case where the operation amount of the accelerator pedal 81 exceeds the second predetermined amount. That is, the release side frictional engagement element releasing means actuates when the downshift operation determination of the multi-stage automatic transmission 6 is generated (outputted), and outputs a command to the hydraulic pressure control mechanism 68 to conduct a control so that the releasing pressure PA of the release side frictional engagement element 66A is removed.

The motor generator rotation speed control means performs the rotation speed control of the motor generator 3 so that the motor rotation speed Nm is assumed to be equal to the next gear shift stage input shaft rotation speed Ni2 when the release side frictional engagement element 66A is released (disengaged). That is, the motor generator rotation speed control means establishes a driving mode of the inverter device 34 and controls the speed to increase under a condition that the next gear shift stage input shaft rotation speed Ni2 is set as the requested motor rotation speed Nmr.

The engagement side frictional engagement element engaging means establishes the engaged state of the engagement side frictional engagement element 66B which is configured to be in the released state at the establishment of the current gear shift stage and is configured to be in the engaged state at the establishment of the next gear shift stage among the plural frictional engagement elements 661-665 on the basis of the relationship between the next gear shift stage input shaft rotation speed Ni2 and the motor rotation speed Nm increased by the rotation speed control of the motor generator 3. That is, the engagement side frictional engagement element engaging means outputs a command to control the hydraulic pressure control mechanism 68 so that the engaging pressure PB of the engagement side frictional engagement element 66B is generated.

The output increasing means is configured to increase an output of the engine 2 when the maximum time Tc-max for execution of engagement of the front clutch 4 elapses after the front clutch engagement commanding means outputs the engaging command and when the absolute value of the rotation speed difference of the motor rotation speed Nm and the engine rotation speed Ne is equal to or less than a threshold value. That is, the output increasing means increases an output of the engine 2 swiftly after confirming that the front clutch 4 is engaged.

Next, a function which varies when conducting a control in which the engaging operation of the front clutch 4 is prioritized in accordance with the third operation pattern P3 shown in FIG. 3 will be explained hereinafter. In those circumstances, the engine rotation speed control means performs the rotation speed control of the engine so that the engine rotation speed Ne is assumed to be equal to a current gear shift stage input shaft rotation speed Ni1 which is obtained by multiplying the output shaft rotation speed Nw by a gear ratio of the current gear shift stage. That is, the engine rotation speed control means sets the requested engine rotation speed Ner with the current gear shift stage input shaft rotation speed Ni1 as a control target instead of the next gear shift stage input shaft rotation speed Ni2, and controls the opening degree S of the throttle valve 22 of the engine 2 to increase the engine rotation speed Ne. The gear shift operation at the multi-stage automatic transmission 6 is not considered in this control, and this control is defined as a control in which the engaging operation of the front clutch 4 is prioritized.

Further, the front clutch engagement commanding means outputs an engaging command for switching the states of the front clutch 4 from the released state (disengaged state) to the engaged state on the basis of a relationship of the motor rotation speed Nm and the engine rotation speed Ne which is increased to be equal to the current gear shift stage input shaft rotation speed Ni1 by the rotation speed control of the engine 2. Further, the front clutch engagement commanding means outputs an engaging command when the synchronization completion estimation time Tsyn which is obtained by dividing the rotation speed difference of the engine rotation speed Ne and the current gear shift stage input shaft rotation speed Ni1 by the rotation speed incremental gradient dNe of the engine 2 is equal to or shorter than the minimum time Tc-min for execution of engagement of the front clutch 4. In those circumstances, because the downshift operation is not performed simultaneously, it is not necessary to take a condition that a value obtained by dividing the motor rotation speed Nm by the output shaft rotation speed Nw is equal to or greater than a predetermined value, which is considered in the second operation pattern P2, into consideration in the third operation pattern P3.

Further, the output increasing means is configured to increase an output of the engine 2 when the maximum time Tc-max for execution of engagement of the front clutch 4 elapses after the front clutch engagement commanding means outputs the engaging command and when the absolute value of the rotation speed difference of the motor rotation speed Nm and the engine rotation speed Ne is equal to or less than a threshold value. That is, the output increasing means increases an output of the engine 2 swiftly before starting the downshift operation after confirming that the front clutch 4 is engaged.

The release side frictional engagement element releasing means is configured to release (disengage) the release side frictional engagement element 66A after an elapse of a gear shifting delay time Td after the front clutch engaging means engages the front clutch 4. Further, the release side frictional engagement element releasing means releases (disengages) the release side frictional engagement element 66A after increasing the output of the engine 2. That is, the release side frictional engagement element releasing means operates successively after the output of the engine 2 is increased during the gear shifting delay time Td after the completion of the engaging operation of the front clutch 4 to start the downshift operation.

Figure 5:
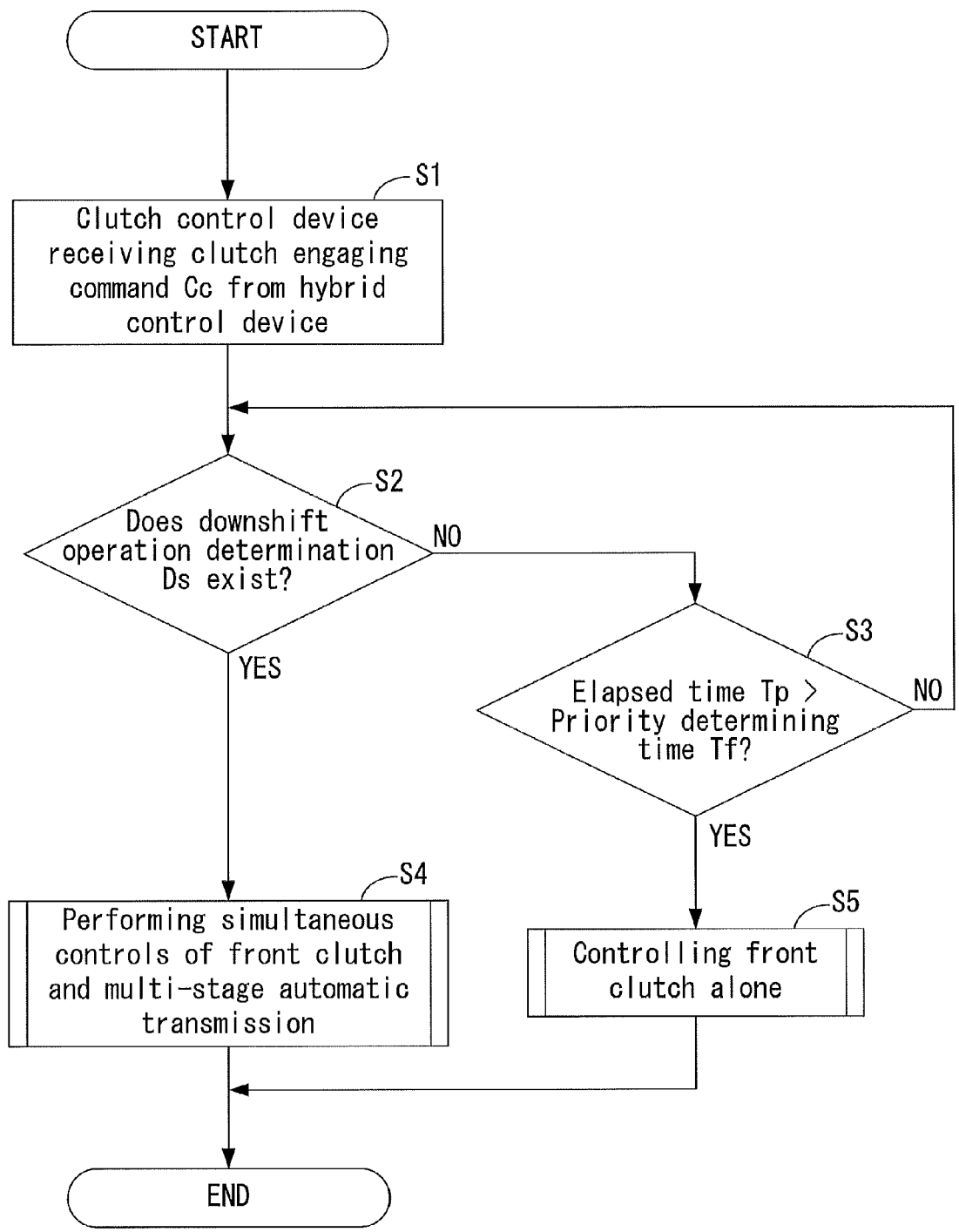
FIG. 5 shows a flowchart for a main control flow of the control device according to the embodiment disclosed here.

Control flows for the control device according to the embodiment will be explained hereinafter. Referring to FIG. 5 for explaining a main control flow, at Step S1, when the clutch control device 44 receives a clutch engaging command Cc from the hybrid control device 7, first, the engaging operation of the front clutch 4 is started to be controlled. This operation corresponds to starting the control for the engaging operation in response to the generation (output) of the clutch engaging command explained referring to FIGS. 2A to 4B. At this point, the timer means for timing the elapsed time Tp is started. Next, at Step S2, the transmission control device 69 determines whether a downshift operation determination Ds occurs (is generated, outputted, determined, or exists). In a case where the downshift operation determination Ds does not occur, the transaction advances to Step S3 where whether the elapsed time Tp exceeds the priority determining time Tf is determined. In a case where the elapsed time Tp is not longer than the priority determining time Tf, the transaction returns to Step S2 to repeatedly determine whether the downshift operation determination Ds occurs.

In a case where the downshift operation determination Ds occurs before the elapsed time Tp exceeds the priority determining time Tf at Step S2, the transaction advances to Step S4 to simultaneously control the engaging operation of the front clutch 4 and the downshift operation of the multi-stage automatic transmission 6. The simultaneous controls in Step S4 will be explained in details referring to FIG. 6 hereinafter. In a case where the downshift operation determination Ds does not occur after the elapsed time Tp exceeds the priority determining time Tf at Step S3, the transaction advances to Step S5 where the engaging operation of the front clutch 4 alone is controlled. The control of the front clutch 4 alone at Step S5 is shown in details in FIG. 7. By the execution of either Step S4 or Step S5, one cycle of the main control flow is completed.

Figure 6:
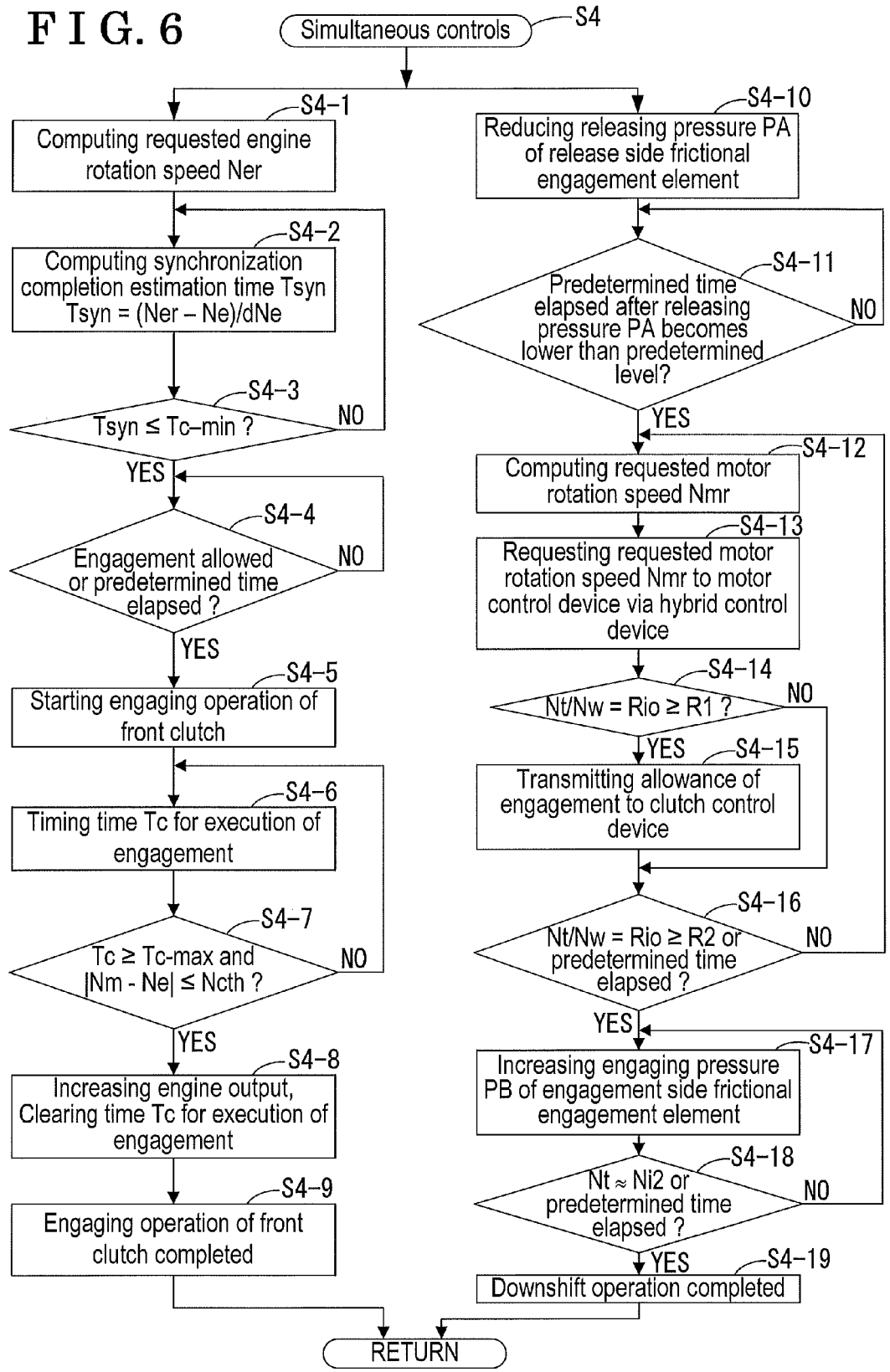
FIG. 6 shows a flowchart for simultaneous controls of a front clutch and a multi-stage automatic transmission.

In FIG. 6 for explaining simultaneous control flows, Steps S4-1 to S4-9 at left-hand side show a control executed mainly by the clutch control device 44, and Steps S4-10 to S4-19 at right-hand side show a control executed mainly by the transmission control device 69. The clutch control device 44 starts controlling the engaging operation of the front clutch 4 at Step S4-1 to compute the requested engine rotation speed Ner. The requested engine rotation speed Ner is an amount set as a control target for increasing the actual engine rotation speed Ne to the next gear shift stage input shaft rotation speed Ni2. Thus, the requested engine rotation speed Ner can be set as the next gear shift stage input shaft rotation speed Ni2 per se, however, may be set to a value slightly greater than the next gear shift stage input shaft rotation speed Ni2. The next gear shift stage input shaft rotation speed Ni2 can be obtained by multiplying the current output shaft rotation speed Nw by a gear ratio of the next gear shift stage. The clutch control device 44 performs the rotation speed control relative to the engine 2 via the hybrid control device 7 and the engine control device 24. The engine control device 24 controls the engine 2 to increase the engine rotation speed Ne to accord to the requested engine rotation speed Ner. Thus, the engine rotation speed Ne increases by a substantially constant rotation speed incremental gradient dNe.

Next, at Step S4-2, the synchronization completion estimation time Tsyn is computed on a real time basis by the following formula: Tsyn=(Ner−Ne)/dNe Then, at Step S4-3, whether the synchronization completion estimation time Tsyn is assumed to be equal to or lower than the minimum time Tc-min for execution of engagement of the front clutch 4 is determined, and the transactions of Step S4-2 and Step S4-3 are repeated until the conditions are satisfied.

When the condition defined in Step S4-3 is satisfied, the transaction advances to Step S4-4 to determine whether the engagement is allowed (allowance of engagement) or whether a predetermined time is elapsed. The allowance of the engagement is the information that the transmission control device 69 outputs at Step S4-15. The predetermined time is timed by a guard timer and serves as a backup in a case where the clutch control device 44 cannot receive the information of the allowance of engagement because of defects. Until the condition is satisfied, the transaction of Step S4-4 is repeated and the transaction advances to Step S4-5 when the condition is satisfied.

At Step S4-5, the engaging operation of the front clutch 4 starts. Simultaneously, an engagement execution timer is started at Step S4-6 to time the time Tc for execution of engagement on a real time basis. Next, at Step S4-7, whether the time Tc for execution of engagement is equal to or longer than the maximum time Tc-max for execution of engagement and the absolute value of the rotation speed difference of the motor rotation speed Nm and the engine rotation speed Ne is equal to or lower than a threshold value Ncth. At Step S4-7, the engagement state of the front clutch 4 is confirmed. In a case where the condition is not satisfied, the transactions of Steps S4-6 and S4-7 are repeated, and the transaction advances to Step S4-8 when the conditions are satisfied.

At Step S4-8 after the engaging state of the front clutch 4 is confirmed, the output of the engine 2 is increased, and the time Tc for execution of engagement is cleared to reset the engagement execution timer. When the transmission of the torque is established thereafter, at Step S4-9, the control for the engaging operation of the front clutch 4 is completed at Step S4-9.

On the other hand, the transmission control device 69 starts controlling the downshift operation at Step S4-10, which is operated simultaneous with the control of the engaging operation of the front clutch 4 at Step S4-1, to reduce the releasing pressure PA of the release side frictional engagement element 66A. Next, at Step S4-11, whether a predetermined time elapses after the releasing pressure PA is assumed to be lower than a predetermined value is determined. At Step S4-11, whether the multi-stage automatic transmission 6 is assumed to be in a neutral state is confirmed. At Step S4-11, that an input torque to the multi-stage automatic transmission 6 is assumed to be lower than a predetermined value may serve as an alternative determination condition. The transaction at Step S4-11 is repeated until the condition is satisfied, and the transaction advances to Step S4-12 when the condition is satisfied. At Step S4-12, the requested motor rotation speed Nmr is computed. The requested motor rotation speed Nmr is an amount set as the control target for increasing the actual motor rotation speed Nm to the next gear shift stage input shaft rotation speed Ni2. Thus, for example, the next gear shift stage input shaft rotation speed Ni2 may be set as the requested motor rotation speed Nmr.

At Step S4-13, the requested motor rotation speed Nmr is requested to the motor control device 36 via the hybrid control device 7. Thus, the motor control device 36 is configured to control the motor generator 3 to increase the motor rotation speed Nm to accord to the requested motor rotation speed Nmr. Next, at Step S4-14, a ratio Rio obtained by dividing the turbine rotation speed Nt by the output shaft rotation speed Nw is assumed to be equal to or greater than a first predetermined ratio R1. In those circumstances, the turbine rotation speed Nt accords to the rotation speed of the input shaft 61 of the multi-stage automatic transmission 6. The turbine rotation speed Nt also accords to the motor rotation speed Nm when the lockup clutch 53 of the torque converter 5 is engaged. Further, the first predetermined ratio R1 is an indicator for roughly determining that the rotation speed of the input shaft 61 becomes closer to the required rotation speed.

When the condition is satisfied at Step S4-14, the transaction advances to Step S4-15, and the information for allowing the engagement (allowance of engagement) is directly outputted to the clutch control device 44. In steps S4-14 and S4-15, it is informed that there is no possibility of the abrupt fluctuation of the motor rotation speed Nm because the motor rotation speed Nm becomes closer to the requested rotation speed and the condition for starting the engagement of the front clutch 4 is satisfied. In a case where the condition in step S4-14 is not satisfied when executing Step S4-15, the transaction advances to Step S4-16.

In Step S4-16, whether the ratio Rio obtained by dividing the turbine rotation speed Nt (rotation speed of the input shaft 61) by the output shaft rotation speed Nw is assumed to be equal to or greater than a second predetermined ratio R2 or whether a predetermined time is elapsed is determined. Here, the second predetermined ratio R2 corresponds to an indicator for determining that the rotation speed of the input shaft 61 substantially accords to the requested rotation speed, and is defined to be a value greater than the first predetermined ratio R1. By setting the second predetermined ratio R2, a load of a frictional sliding motion of the engagement side frictional engagement element 66B is reduced. The predetermined time is timed by the guard timer and serves as a backup when an increment of the turbine rotation speed Nt (rotation speed of the input shaft 61) is delayed for some reasons. When the condition at Step S4-16 is not satisfied, the transaction returns to Step S4-12 and the requested motor rotation speed Nmr is re-computed to repeat the transactions in Step S4-12 to S4-16.

When the condition at Step S4-16 is satisfied, the transaction advances to Step S4-17 to increase the engaging pressure PB of the engagement side frictional engagement element 66B. Then, at Step S4-18, whether the turbine rotation speed Nt (rotation speed of the input shaft 61) accords to the next gearshift stage input shaft rotation speed Ni2 or whether the predetermined time elapses is determined. When the condition at Step S4-18 is not satisfied, the transactions in Steps S4-17 and S4-18 are repeated, and the transaction advances to Step S4-19 when the condition is satisfied. In a normal operation, the condition is satisfied within a predetermined time and the satisfied condition after the elapse of the predetermined time serves as a backup in a case where synchronization is delayed due to any causes in the multi-stage automatic transmission 6. In Step S4-19, the control for the downshift operation of the multi-stage automatic transmission 6 is completed.

A control flow for the front clutch 4 alone will be explained with reference to FIG. 7. Steps S5-1 to S5-9 at left-hand side show a control mainly by the clutch control device 44, and Steps S5-10 to S5-13 at right-hand side show a control mainly by the transmission control device 69. Further, Steps S5-1 to S5-9 similar to Steps S4-1 to S4-9 in the simultaneous control flow in FIG. 6. Thus, the explanation will not be repeated. In those circumstances, at Step S5-1, the requested engine rotation speed Ner is computed on the basis of the current gear shift stage input shaft rotation speed Ni1 instead of the next gear shift stage input shaft rotation speed Ni2. Further, at Step S5-4, the engagement is constantly allowed (allowance of the engagement constantly occurs) because the transmission control device 69 does not control the gearshift operation and constantly outputs the allowance of the engagement (constantly allows the engagement).

Figure 7:
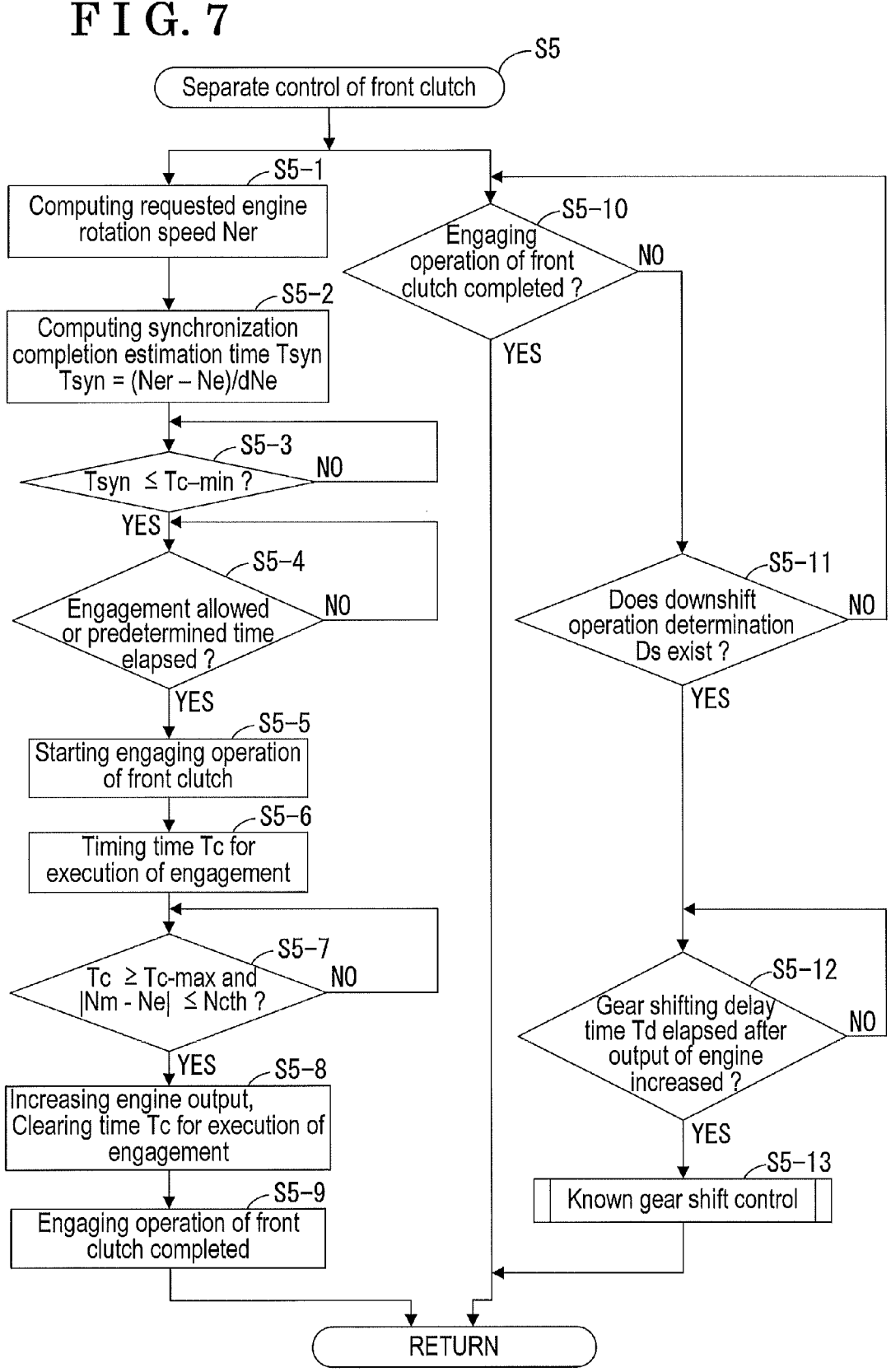
FIG. 7 shows a flowchart for a control of the front clutch alone.

In parallel to the control of the engaging operation of the front clutch 4 by the clutch control device 44 in Steps S5-1 to S5-9 in FIG. 7, the transmission control device 69 determines whether the engaging operation of the front clutch 4 is completed at Step S5-10. In a case where the engaging operation still continues (i.e., No at Step S5-10), the transaction advances to Step S5-11 where the transmission control device 69 determines whether the downshift operation determination Ds occurs (is generated, outputted, exists). When the downshift operation determination Ds occurs, the transaction advances to Step S5-12 where whether the gear shifting delay time Td after the increase of the output of the engine 2 elapses, that is, whether a torque transmission at the front clutch 4 is established is determined. In a case where the gear shifting delay time Td is not elapsed, the transaction in Step S5-12 is repeated and the transaction advances to Step S5-13 when the gear shifting delay time Td elapses. At Step S5-13, a control for the downshift operation alone is conducted.

Further, in a case where the downshift operation determination Ds does not occur (is not generated), the transactions at Steps S5-10 and S5-11 are repeated to continuously determine the existence (occurrence) of the downshift operation determination Ds until the engaging operation of the front clutch 4 is completed. In a case where the downshift operation determination Ds is not generated despite the completion of the engaging operation of the front clutch 4, the transmission control device 69 does not control the gearshift operation. Thus, in a case where the downshift operation determination Ds is generated during a period after the priority determining time Tf elapses by the front clutch 4 is engaged and the output of the engine 2 is increased, first, the control device controls the engaging operation of the front clutch 4 alone (separately), and then successively controls the downshift operation of the multi-stage automatic transmission 6 alone (separately). In a case where the downshift operation determination Ds is not generated until the output of the engine 2 is increased, the control device controls the engaging operation of the front clutch 4 alone as a consequence.

The engine rotation speed control means (engine rotation speed control device) corresponds to Steps S4-1 and S5-1. The timer means (timer device) corresponds Step S3. The front clutch engagement commanding means (front clutch engagement commanding device) corresponds to Steps S4-2 to S4-4, and Step S5-2 to S5-4. The front clutch engaging means (front clutch engaging device) corresponds to Steps S4-5 and S5-5. The release side frictional engagement element releasing means (release side frictional engagement element releasing device) corresponds to Step S4-10. The motor generator rotation speed control means (motor generator rotation speed control device) corresponds to Steps S4-12 and S4-13. The engagement side frictional engagement element engaging means (engagement side frictional engagement element engaging device) corresponds to Step S4-17. The output increasing means (output increasing device) corresponds to Steps S4-8 and S5-8.

Figure 8:
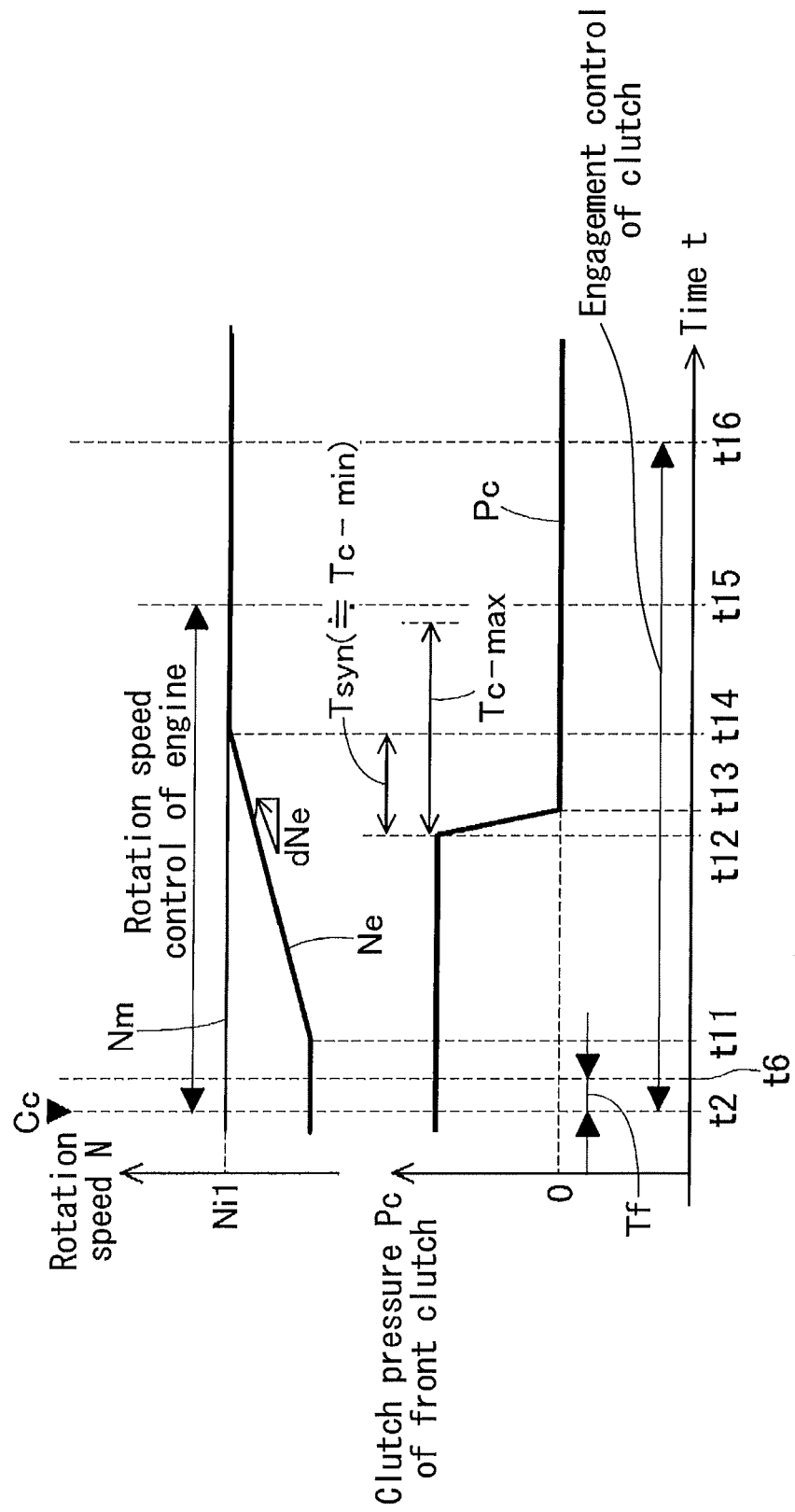
FIG. 8 shows a time chart for explaining an operation when controlling the front clutch alone in accordance with the first operation pattern of the accelerator pedal explained in FIGS. 2A and 2B.
Figure 9:
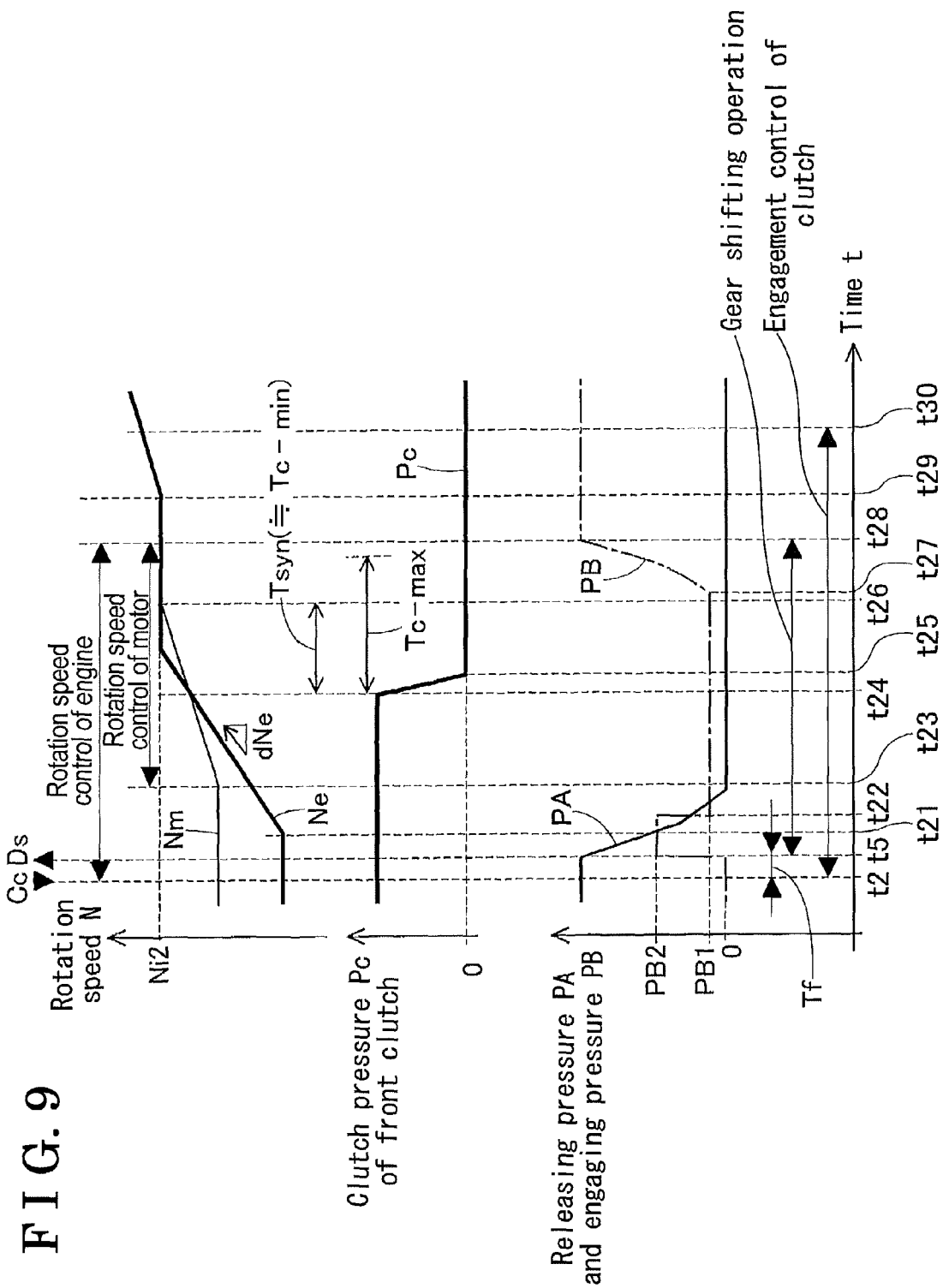
FIG. 9 shows a time chart for explaining an operation when simultaneously controlling the front clutch and the multi-stage automatic transmission in accordance with the second operation pattern of the accelerator pedal explained in FIGS. 3A and 3B.

A control operation of the control device and an operation of the hybrid vehicle drive system 1 operated in accordance with the control device will be explained with reference to the first to third operation patterns P1 to P3 of the accelerator pedal 81. FIG. 8 shows a time chart for explaining an operation of the front clutch 4 alone in accordance with the first operation pattern P1 of the accelerator pedal 81 explained in FIGS. 2A, 2B. FIG. 9 shows a time chart for explaining an operation when simultaneously controlling the front clutch 4 and the multi-stage automatic transmission 6 in accordance with the second operation pattern P2 of the accelerator pedal 81 explained in FIGS. 3A, 3B. Further, FIG. 10 shows a time chart for explaining an operation when controlling the front clutch 4 alone and the multi-stage automatic transmission 6 alone in the mentioned order in accordance with the third operation pattern P3 of the accelerator pedal 81 explained in FIGS. 4A, 4B.

Figure 10:
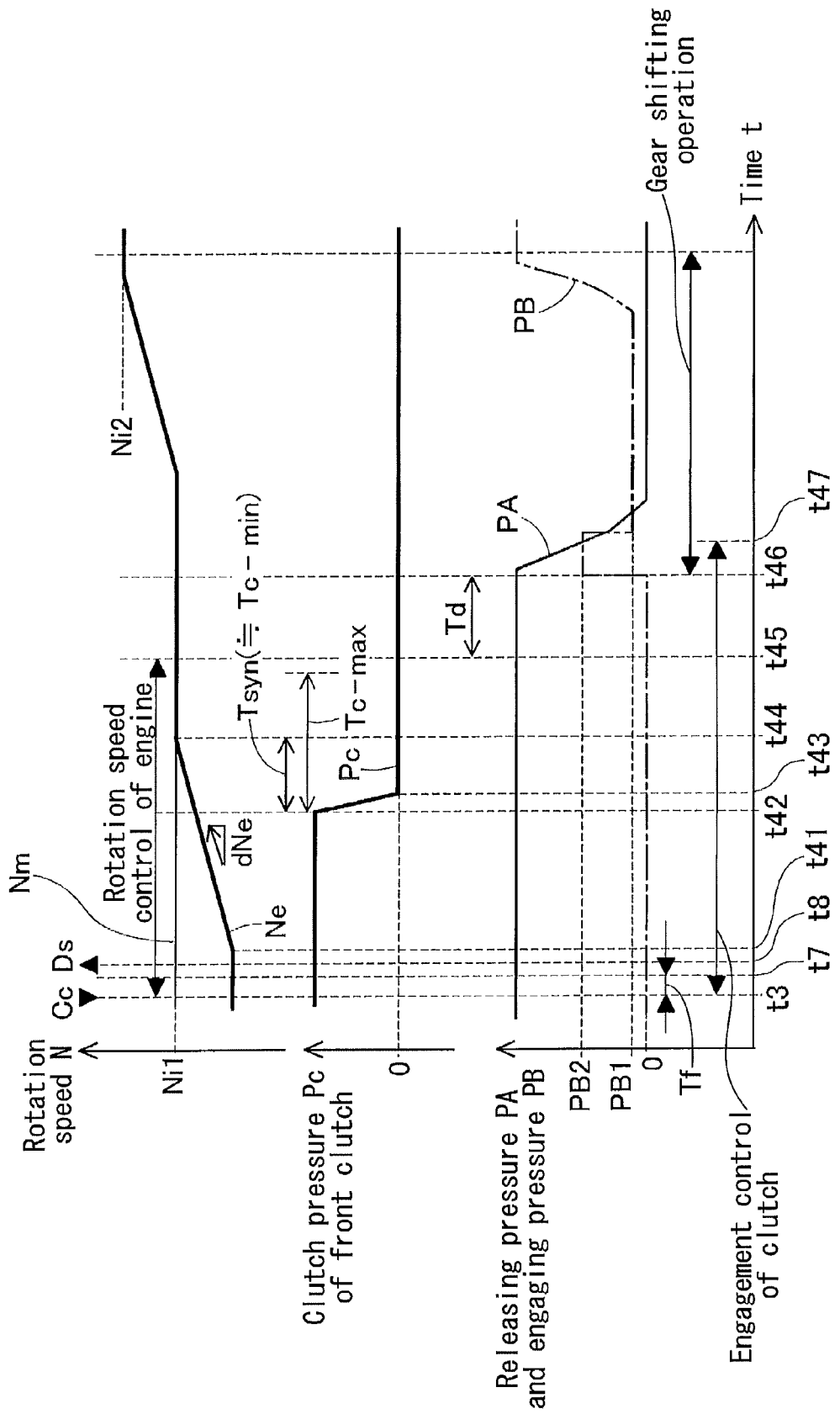
FIG. 10 shows a time chart for explaining an operation when controlling the front clutch alone and the multi-stage automatic transmission alone in the mentioned order in accordance with the third operation pattern of the accelerator pedal explained in FIGS. 4A and 4B.

A common time t is plotted on horizontal axes in FIGS. 8 to 10. In FIGS. 8 to 10, a graph shown at a top level shows the engine rotation speed Ne and the motor rotation speed Nm, a graph shown at a middle level shows the clutch pressure Pc of the front clutch 4, and a graph shown at a bottom level shows the releasing pressure PA and the engaging pressure PB of the multi-stage automatic transmission 6, respectively. The graph at the bottom level is omitted in FIG. 8.

When the engaging command for the front clutch 4 is generated in response to the accelerator opening degree Ac exceeding the accelerator opening degree Ac1 at time t2 in FIG. 8, the clutch control device 44 receives the clutch engaging command Cc from the hybrid control device 7. The clutch control device 44 starts engagement control of the front clutch 4 and the rotation speed control of the engine 2. Then, the downshift operation determination Ds is not generated from time t2 to time t6 during which the priority determining time Tf elapses, and the control for the engaging operation of the front clutch 4 alone is confirmed. After time t6, the control device performs the control based on the control flow shown in FIG. 7. The vehicle speed V after time t2 shows substantially constant level and the motor rotation speed Nm shows substantially constant level.

The clutch control device 44 computes the current gear shift stage input shaft rotation speed Ni1, that is, the requested engine rotation speed Ner which is slightly greater than the motor rotation speed Nm at time t2. An increase in the engine speed of the engine 2 starts at time t11 which is after the priority determining time Tf elapses and the engine rotation speed Ne increases by the substantially constant rotation speed incremental gradient dNe. Further, the clutch control device 44 computes the synchronization completion estimation time Tsyn on a real-time basis successively after time t11 and compares with the minimum time Tc-min for execution of engagement of the front clutch 4. In FIG. 8, a time required up to time t14 at which the engine rotation speed Ne accords to the current gear shift stage input shaft rotation speed Ni1 (motor rotation speed Nm) is defined as the synchronization completion estimation time Tsyn.

At time t12, when the synchronization completion estimation time Tsyn is assumed to be equal to or less than the minimum time Tc-min for execution of engagement, the clutch control device 44 reduces the clutch pressure Tc of the front clutch 4 to start the engaging operation of the front clutch 4, and the clutch pressure Tc is removed at time t13. Because of a dimensional tolerance in structure and a moving time of the operation fluid, a start of the toque transmission by the engagement delays from time t13.

On the other hand, the engine rotation speed Ne substantially synchronizes with the current gear shift stage input shaft rotation speed Ni1, that is, the motor rotation speed Nm at time t14. Then, the front clutch 4 is engaged at time t14 or slightly delaying from time t14. Further, at time t15 after the maximum time Tc-max for execution of engagement elapses from time t12, the increase in the output of the engine 2 starts, then the control for the engaging operation of the front clutch 4 alone is completed at time t16 at which the transmission of the torque is established (at which the torque transmission starts).

Next, at time t2 in FIG. 9, when the engaging command of the front clutch 4 is generated in response to the accelerator opening degree Ac exceeding the accelerator opening degree Ac1, the clutch control device 44 receives the clutch engaging command Cc from the hybrid control device 7. The clutch control device 44 starts the rotation speed control of the engine 2 and the engagement control of the front clutch 4. Then, at time t5 before the priority determining time Tf elapses from time t2, the transmission control device 69 determines whether the downshift operation determination Ds occurs. Thus, conducting the simultaneous controls mainly by the clutch control device 44 and mainly by the transmission control device 69 is confirmed, and the transmission control device 69 starts the control of the downshift operation at time t5. Thereafter, the clutch control device 44 and the transmission control device 69 perform the controls based on the simultaneous control flow shown in FIG. 6.

The clutch control device 44 computes the requested engine rotation speed Ner on the basis of the next gear shift stage input shaft rotation speed Ni2 at time t2. Then, the speed of the engine 2 starts increasing at time t21 which is after an elapse of the priority determining time Tf, and the engine rotation speed Ne increases by the substantially constant rotation speed incremental gradient dNe. After time t21, the clutch control device 44 successively computes the synchronization completion estimation time Tsyn on the real-time basis and compares the computed synchronization completion estimation time Tsyn with the minimum time Tc-min for execution of engagement. In FIG. 9, the required time up to time t26 where the engine rotation speed Ne securely accords to the next gear shift stage input shaft rotation speed Ni2 is defined as the synchronization completion estimation time Tsyn.

At time t24, when the synchronization completion estimation time Tsyn is assumed to be equal to or less than the minimum time Tc-min for execution of engagement and when receiving the allowance of engagement from the transmission control device 69, the clutch control device 44 reduces the clutch pressure Tc of the front clutch 4 to start the engaging operation of the front clutch 4, and the clutch pressure Tc is removed at time t25. In those circumstances, because of the tolerance in structure and a moving time of the operation fluid, a start of the toque transmission by the engagement delays from time t25. On the other hand, the engine rotation speed Ne substantially synchronizes with the next gear shift stage input shaft rotation speed Ni2 at time t26. Then, the front clutch 4 is engaged either at time t26 or slightly delaying from time t26.

Further, the transmission control device 69 reduces the releasing pressure PA of the release side frictional engagement element 66A at time t5. When the releasing pressure PA is removed at time t23 and the release side frictional engagement element 66A is assumed to be in the released state, the multi-stage automatic transmission 6 is assumed to be in a neutral state. Upon being the neutral state, the transmission control device 69 starts the rotation speed control of the motor generator 3 and computes the requested motor rotation speed Nmr corresponding to the next gear shift stage input shaft rotation speed Ni2. After time t23, the motor rotation speed Nm is increased, and is substantially synchronized with the next gear shift stage input shaft rotation speed Ni2 at time t26. Accordingly, the engine rotation speed Ne and the motor rotation speed Nm synchronize at the next gear shift stage input shaft rotation speed Ni2, and thereafter, the front clutch 4 is engaged.

Further, the transmission control device 69 increases the engaging pressure PB of the engagement side frictional engagement element 66B to an intermediate pressure PB2 at time t5, maintains the intermediate pressure PB2 by time t22, and reduces the pressure to a lower pressure PB1 and maintains the lower pressure PB1. By the generation of the intermediate pressure PB2, a tolerance in structure of the engagement side frictional engagement element 66B can be eliminated in advance, and a state without the tolerance in structure can be maintained by maintaining the lower pressure PB1. At time t27 which is after the synchronization to the next gear shift stage input shaft rotation speed Ni2 is achieved at time t26, the transmission control device 69 increases the engaging pressure PB to a maximum level, and the engagement side frictional engagement element 66B engages at time t28. Thus, the control for the downshift operation of the multi-stage automatic transmission 6 ends.

Further, at time t29 which is after the maximum time Tc-max for execution of engagement elapses from time t24, the increase in the output of the engine 2 starts to increase the engine rotation speed Ne, and the motor generator 3 is synchronously controlled so that the motor rotation speed Nm synchronously increases. Thus, the vehicle is swiftly accelerated. Further, thereafter, at time t30 at which the torque transmission is established, the engaging operation of the front clutch 4 is completed.

Next, at time t3 in FIG. 10, upon the generation of the engaging command of the front clutch 4 when the accelerator opening degree Ac exceeds the accelerator opening degree Ac1, the clutch control device 44 receives the clutch engaging command Cc from the hybrid control device 7. The clutch control device 44 starts the rotation speed control of the engine 2 and the engagement control of the front clutch 4. Then, at time t8 which is after elapsing the priority determining time Tf from time t3, the transmission control device 69 determines whether the downshift operation determination occurs. Accordingly, conducting separate controls (asynchronous controls) sequentially is confirmed, and the downshift operation of the multi-stage automatic transmission 6 is assumed to be temporarily in a wait mode. Thereafter, the clutch control device 44 and the transmission control device 69 conduct a control based on the flow for separate controls (asynchronous controls) shown in FIG. 7.

The clutch control device 44 computes the requested engine rotation speed Ner on the basis of the current gear shift stage input shaft rotation speed Ni1 at time t3. The speed of the engine 2 starts increasing at time t41 after the priority determining time Tf elapses, and the engine rotation speed Ne increases by the substantially constant rotation speed incremental gradient dNe. After time t41, successively, the synchronization completion estimation time Tsyn is computed on the real-time basis and is compared with the minimum time Tc-min for execution of engagement. For example, in FIG. 10, the time required up to time t44 at which the engine rotation speed Ne accords to the current gear shift stage input shaft rotation speed Ni1 (motor rotation speed Nm) is defined as the synchronization completion estimation time Tsyn.

At time t42, when the synchronization completion estimation time Tsyn is assumed to be equal to or shorter than the minimum time Tc-min for execution of engagement, the clutch control device 44 reduces the clutch pressure Tc of the front clutch 4 to start the engaging operation of the front clutch 4, and the clutch pressure Tc is removed at time t43. In those circumstances, because of the dimensional tolerance in structure and a moving time of the operation fluid, the start of the torque transmission by the engagement delays from time t43.

On the other hand, the engine rotation speed Ne substantially synchronizes with the current gear shift stage input shaft rotation speed Ni1, that is, the motor rotation speed Nm at time t44. Then, the front clutch 4 is engaged at time t44 or slightly delaying from time t44. Further, at time t45 which is after the maximum time Tc-max for execution of engagement elapses from time t42, an increase in the output of the engine 2 starts. Then, at time t47 at which the torque transmission is established, the separate control (asynchronous control) of the engaging operation of the front clutch 4 is ended.

Further, at time t46 which is defined as the time that the gear shifting delay time Td elapses from time t45, the separate control (asynchronous control) of the downshift operation of the multi-stage automatic transmission 6 in the wait mode starts. A known technology is applied as the separate control (asynchronous control), thus the explanation in details will be omitted.

According to the control device of the hybrid vehicle drive system 1, when the engaging command Cc of the front clutch 4 and the downshift operation determination Ds of the multi-stage automatic transmission 6 are generated within the priority determining time Tf, the engaging operation of the front clutch 4 and the downshift operation of the multi-stage automatic transmission 6 are simultaneously controlled. Thus, comparing to a known device in which the engaging operation of the front clutch 4 is controlled, first, and the downshift operation of the multi-stage automatic transmission 6 is controlled subsequently, according to the construction of the embodiment, two operations are completed in a shorter time, which allows to swiftly start accelerating the vehicle.

Further, the front clutch engagement commanding means outputs the engaging command for switching the states of the front clutch 4 from the disengaged state to the engaged state when the value obtained by dividing the motor rotation speed Nm by the output shaft rotation speed Nw is equal to or greater than the predetermined value, and when the synchronization completion estimation time Tsyn obtained by dividing a current rotation speed difference between the engine rotation speed Ne and the next gear shift stage input shaft rotation speed Ni2 by the rotation speed incremental gradient dNe is equal to or shorter than the minimum time Tc-min for execution of engagement of the front clutch 4. Accordingly, at a moment when the front clutch 4 engages, the rotation speeds of the driving side and the driven side are securely synchronized so as not to generate the engagement shock, and because the front clutch 4 starts the engaging operation before the rotation speeds of the driving side and the driven side are synchronized, the required time for the engagement is shortened.

Further, the output increasing means for increasing the output of the engine 2 when the maximum time Tc-max for execution of engagement of the front clutch 4 elapses after the front clutch engagement commanding means outputs the engaging command and when the absolute value of the rotation speed difference of the motor rotation speed Nm and the engine rotation speed Ne is equal to or less than a threshold value is provided. Thus, the output increasing means increases an output of the engine 2 swiftly after confirming that the front clutch 4 is engaged, accordingly, the acceleration of the vehicle is swiftly started.

When the engaging command Cc of the front clutch 4 and the downshift operation determination Ds of the multi-stage automatic transmission 6 are generated exceeding the priority determining time Tf, the separate control of the engaging operation of the front clutch 4 is conducted first, then subsequently, the downshift operation of the multi-stage automatic transmission 6 is controlled alone. Thus, two operations are securely controlled without interferences, and two operations are controlled successively so that the acceleration of the vehicle is started swiftly.

The control device according to the embodiment includes the hybrid control device 7 and the controls devices 24, 36, 44, and 69. The foregoing constructions and assigned functions explained here are examples, and combinations of hardware and software can be varied. Further, the determination methods and constants are not limited to the foregoing embodiment and can be varied.

According to the embodiment, the control device for hybrid vehicle drive system controlling the hybrid vehicle drive system which includes the motor generator (3) including the rotor (31) and the stator (32), the motor generator for driving the vehicle and producing the electric power when reducing speed to apply a regenerative braking force to the vehicle, the front clutch (4) rotatably connecting the rotor (31) and the output shaft (21) of the engine (2) to be selectively engageable, and the multi-stage automatic transmission (6) having the input shaft (61) rotatably connected to the rotor (31), the output shaft (62) rotatably connected to driving wheels, and the plural frictional engagement elements (661, 662, 663, 664, 665) selectively engaged and disengaged for switching plural gear shift stages having gear ratios, each of which is obtained by dividing a rotation speed of the input shaft (61) by a rotation speed of the output shaft (62), different from one another. The control device for hybrid vehicle drive system controls switching operations of an engaged state and a disengaged state of the front clutch (4) and controls gear shifting operation of the multi-stage automatic transmission (6), which includes the engine rotation speed control device, the front clutch engagement commanding device, the release side frictional engagement element releasing device, the motor generator rotation speed control device, and the engagement side frictional engagement element engaging device. The engine rotation speed control device performs a rotation speed control of the engine (2) so that a rotation speed of the output shaft (21) of the engine (2) is assumed to be equal to the next gear shift stage input shaft rotation speed (Ni2) obtained by multiplying the rotation speed of the output shaft (62) of the multi-stage automatic transmission (6) by a gear ratio of a next gear shift stage when an operation amount of an accelerator pedal (81) increases from an operation amount smaller than the first predetermined amount (Ac1) at which the engaged state and the disengaged state of the front clutch (4) is switched to an operation amount greater than the second predetermined amount, at which gear stages are switched from the current gear shift stage currently established by the multi-stage automatic transmission (6) to the next gear shift stage whose gear ratio is greater than the current gear shift stage, within the priority determining time. The front clutch engagement commanding device outputs the engaging command for switching the front clutch from the disengaged state to the engaged state on the basis of a relationship between a rotation speed of the output shaft (21) of the engine (2) increased by the rotation speed control of the engine and a rotation speed of the rotor (31) of the motor generator (3). The front clutch engaging device is configured to switch the front clutch from the disengaged state to the engaged state in accordance with the engaging command. The release side frictional engagement element releasing device is configured to disengage a release side frictional engagement element which is configured to be engaged when the current gear shift stage is established and configured to be disengaged when the next gear shift stage is established among the plurality of frictional engagement elements when the operation amount of the accelerator pedal (81) exceeds the second predetermined amount. The motor generator rotation speed control device performs a rotation speed control of the motor generator (3) to make a rotation speed of the rotor (31) of the motor generator (3) be equal to the next gear shift stage input shaft rotation speed when the release side frictional engagement element is disengaged. The engagement side frictional engagement element engaging device establishes an engaged state of an engagement side frictional engagement element which is configured to be a disengaged state when the current gear shift stage is established and is configured to be the engaged state when the next gear shift stage is established among the plurality of the frictional engagement elements for the multi-stage automatic transmission (6) on the basis of a relationship between the rotation speed of the rotor (31) of the motor generator (3) increased by the rotation speed control of the motor generator (3) and the next gearshift stage input shaft rotation speed (Ni2).

With the construction of the control device for the hybrid vehicle drive system according to the embodiment, when the operation amount of the accelerator pedal 81 increases from a level lower than the first predetermined amount (accelerator opening degree Ac1) to a level greater than the second predetermined amount (operation amount of the accelerator pedal 81 corresponding to the downshift line Ldn) within the priority determining time Tf, the engaging operation of the front clutch 4 and the downshift operation of the multi-stage automatic transmission 6 are simultaneously controlled. More particularly, when the operation amount of the accelerator pedal 81 exceeds the first predetermined amount (accelerator opening degree Ac1), the rotation speed of the output shaft 21 of the engine 2 (i.e., referred to as the engine rotation speed) is increased to be equal to the next gear shift stage input shaft rotation speed Ni2, and the front clutch 4 is engaged on the basis of a relationship between the increased engine rotation speed and a rotation speed of the rotor 31 of the motor generator 3 (i.e., referred to as the motor rotation speed). On the other hand, when the operation amount of the accelerator pedal 81 exceeds the second predetermined amount, the release side frictional engagement element 66A of the multi-stage automatic transmission 6 is disengaged, the motor rotation speed is increased to be equal to the next gear shift stage input shaft rotation speed Ni2, and the engagement side frictional engagement element 66B of the multi-stage automatic transmission 6 is engaged on the basis of a relationship between the increased motor rotation speed and the next gearshift stage input shaft rotation speed Ni2.

In those circumstances, the downshift operation for switching the gear stages to the next gear stage whose gear ratio is greater than the current gear shift stage is applied as the gear shift stage switching operation (i.e., referred to as the shift operation) of the multi-stage automatic transmission 6, the increase in the engine speed and the increase in the motor generator speed are controlled simultaneously, and the engaging operation of the front clutch 4 and the selective disengaging (releasing) and engaging operations of the frictional engagement elements 661, 662, 663, 664, 665 of the multi-stage automatic transmission 6 are simultaneously controlled. Thus, comparing to a known device in which the engaging operation of the front clutch is controlled, first, and the downshift operation of the multi-stage automatic transmission is controlled subsequently, according to the construction of the embodiment, two operations are completed in shorter time to swiftly start accelerating the vehicle.

The control device for hybrid vehicle drive system includes the timer device timing an elapsed time after the operation amount of the accelerator pedal (81) exceeds the first predetermined amount (Ac1). When the operation amount of the accelerator pedal (81) exceeds the second predetermined amount before the elapsed time timed by the timer device exceeds the priority determining time (Tf), it is determined that the operation amount of the accelerator pedal (81) increases from the operation amount smaller than the first predetermined amount (Ac1) to the operation amount greater than the second predetermined amount within the priority determining time (Tf), and it is determined that the priority determining time has elapsed before the operation amount of the accelerator pedal exceeds the second predetermined amount when the elapsed time exceeds the priority determining time before the operation amount of the accelerator pedal exceeds the second predetermined amount.

According to the construction of the embodiment, the control device for the hybrid vehicle drive system includes the timer device for timing an elapsed time after the operation amount of the accelerator pedal 81 exceeds the first predetermined amount (accelerator opening degree Ac1), and determines whether to perform the simultaneous control of the engaging operation of the front clutch 4 and the downshift operation of the multi-stage automatic transmission 6 on the basis of a relationship between the elapsed time and the priority determining time Tf. Increments of the operation amount when stepping on the accelerator pedal (when applying the accelerator pedal) are different for every operation, and there is a case that a request for downshift operation is not generated even if the request for engaging the front clutch is generated according to known structures. Further, in a case where the operation speed of the accelerator pedal is slow, the determination whether to perform the simultaneous control may require longer time. As a countermeasure, according to the construction of the embodiment, by timing the elapsed time, one of a case for performing the simultaneous control, a case for performing the engagement control of the front clutch 4 alone, and a case for performing the downshift operation of the multi-stage automatic transmission 6 successively from performing the engagement control of the front clutch 4 is selective appropriately within a short period during which the priority determining time Tf elapses, which contributes to performing the control without delay.

According to the embodiment, the front clutch engagement commanding device outputs the engaging command for switching the front clutch (4) from the disengaged state to the engaged state when a ratio obtained by dividing the rotation speed of the rotor (31) of the motor generator (3) by the rotation speed of the output shaft (62) of the multi-stage automatic transmission (6) is equal to or greater than a predetermined ratio and when a synchronization completion estimation time (Tsyn) obtained by dividing a current rotation speed difference between the rotation speed of the output shaft (21) of the engine (2) and the next gear shift stage input shaft rotation speed (Ni2) by a rotation speed incremental gradient (dNe) of the engine (2) is equal to or shorter than a minimum time (Tc-min) for execution of engagement of the front clutch (4).

According to the construction of the embodiment, the front clutch engagement commanding device outputs the engaging command for switching the front clutch 4 from the disengaged state to the engaged state when a ratio obtained by dividing the motor rotation speed by the output shaft rotation speed of the multi-stage automatic transmission 6 is equal to or greater than the predetermined ratio and when the synchronization completion estimation time Tsyn obtained by dividing the current rotation speed difference between the engine rotation speed Ne and the next gear shift stage input shaft rotation speed Ni2 by the rotation speed incremental gradient dNe of the engine 2 is equal to or shorter than the minimum time Tc-min for execution of engagement of the front clutch 4. That is, the front clutch engagement commanding device outputs the engaging command when a possibility of the abrupt fluctuation of the motor rotation speed Nm because the motor rotation speed Nm becomes closer to the requested rotation speed and when it is determined that the engine rotation speed is most likely to be securely synchronized with the next gearshift stage input shaft rotation speed Ni2. Accordingly, because the rotation speeds of the driving side and the driven side are securely synchronized at the moment when the front clutch 4 engages so that the engagement shock does not occur, and because the engaging operation of the front clutch starts before the rotation speeds of the driving side and the driven side synchronize, the required time for the engagement is shortened.

According to the embodiment, the minimum time (Tc-min) for execution of engagement is computed on the basis of a vehicle state including either the rotation speed of the output shaft (21) of the engine (2) or the rotation speed of the rotor (31) of the motor generator (3).

According to the embodiment, the minimum time (Tc-min) for execution of engagement is computed on the basis of a vehicle state including an operation fluid for the control device.

According to the embodiment, the control device for hybrid vehicle drive system includes the output increasing device configured to increase an output of the engine (2) when the maximum time (Tc-max) for execution of engagement of the front clutch (4) elapses after the front clutch engagement commanding device outputs the engaging command and when the absolute value of a rotation speed difference between the rotation speed of the rotor (31) of the motor generator (3) and the rotation speed of the output shaft (21) of the engine (2) is equal to or less than a threshold value.

According to the construction of the embodiment, the control device for the hybrid vehicle drive system includes the output increasing device which increases an output of the engine 2 when the maximum time Tc-max for execution of engagement of the front clutch 4 elapses after the front clutch engagement commanding device outputs the engaging command and when the absolute value of the rotation speed difference between the motor rotation speed and the engine rotation speed is equal to or less than the threshold value. Thus, the output increasing device increases the output of the engine 2 swiftly after confirming that the front clutch 4 is engaged, and thus contributing to start the acceleration of the vehicle swiftly.

According to the embodiment, the maximum time (Tc-max) for execution of engagement is computed on the basis of a vehicle state including either the rotation speed of the output shaft (21) of the engine (2) or a rotation speed of the rotor (31).

According to the embodiment, the maximum time (Tc-max) for execution of engagement is computed on the basis of a vehicle state including an operation fluid for the control device.

According to the embodiment, the engine rotation speed control device performs the rotation speed control of the engine (2) to make the rotation speed of the output shaft (21) of the engine (2) be equal to a current gear shift stage input shaft rotation speed (Ni1) obtained by multiplying the rotation speed of the output shaft (62) of the multi-stage automatic transmission (6) by a gear ratio of the current gear shift stage when the priority determining time elapses before the operation amount of the accelerator pedal exceeds the second predetermined amount. The front clutch engagement commanding device outputs the engaging command for switching the front clutch (4) from the disengaged state to the engaged state on the basis of a relationship between a rotation speed of the rotor (31) of the motor generator (3) and a rotation speed of the output shaft of the engine (2) which is increased to be equal to the current gear shift stage input shaft rotation speed (Ni1) by the rotation speed control of the engine (2). The release side frictional engagement element releasing device disengages the release side frictional engagement element after an elapse of a gear shifting delay time (Td) after the front clutch engaging device engages the front clutch (4).

According to the construction of the embodiment, when the priority determining time Tf elapses before the operation amount of the accelerator pedal 81 exceeds the second predetermined amount, in other words, when the operation amount of the accelerator pedal 81 exceeds the second predetermined amount after the priority determining time Tf elapses, first, the engaging operation of the front clutch 4 is controlled alone (separately), and successively, the downshift operation of the multi-stage automatic transmission 6 is controlled alone (separately). Thus, in a case where the downshift operation is requested during the engaging operation of the front clutch 4 is controlled alone (separately), two operations can be securely controlled without interferences and two operations can be controlled consecutively so as to start accelerating the vehicle swiftly.

According to the embodiment, the front clutch engagement commanding device outputs the engaging command for switching the front clutch from the disengaged state to the engaged state when a synchronization completion estimation time (Tsyn) obtained by dividing a current rotation speed difference between the rotation speed of the output shaft of the engine (2) and the current gear shift stage input shaft rotation speed (Ni1) by a rotation speed incremental gradient (dNe) of the engine (2) is equal to or shorter than the minimum time (Tc-min) for execution of engagement of the front clutch (4).

According to the construction of the embodiment, in a case where the engaging operation of the front clutch 4 is controlled alone (separately) and then successively the downshift operation of the multi-stage automatic transmission 6 is controlled alone (separately), the rotation speeds at the driving side and the driven side are securely synchronized at the moment when the front clutch 4 engages so as not to generate the engagement shock, and the engaging operation of the front clutch 4 starts before the rotation speeds of the driving side and the driven side synchronizes, thus the required time for the engagement is shortened. Accordingly, even when successively controlling the two operations in a separated manner, the acceleration of the vehicle can be started swiftly.

According to the embodiment, the control device for hybrid vehicle drive system includes the output increasing device configured to increase the output of the engine (2) when the maximum time (Tc-max) for execution of engagement of the front clutch (4) elapses after the front clutch engagement commanding device outputs the engaging command and when the absolute value of the rotation speed difference between the rotation speed of the rotor (31) of the motor generator (3) and the rotation speed of the output shaft (21) of the engine (2) is equal to or less than the threshold value. The release side frictional engagement element releasing device disengages the release side frictional engagement element (66A) after the elapse of the gear shifting delay time (Td) after the output of the engine is increased.

According to the construction of the embodiment, in case of controlling the engaging operation of the front clutch 4 alone (separately), and successively controlling the downshift operation of the multi-stage automatic transmission alone (separately), the output of the engine 2 is swiftly increased and the transaction transits to the downshift operation under a condition that the front clutch 4 is engaged is confirmed, thus starting the acceleration of vehicle swiftly.

The embodiment relates to the control device for the hybrid vehicle drive system including the engine and the motor generator which serve as the drive source. More particularly, the embodiment pertains to a cooperative control of the clutch and the transmission provided in the drive system.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control device for controlling a hybrid vehicle drive system, said hybrid vehicle drive system including: (1) a motor generator including a rotor and a stator, the motor generator configured to drive a vehicle and configured to produce electric power when a rotation speed of the rotor of the motor generator is reduced to apply a regenerative braking force to the vehicle, (2) a selectively engageable front clutch configured to rotatably connect the rotor and an engine output shaft of an engine, and (3) a multi-stage automatic transmission having (1) an input shaft rotatably connected to the rotor, (2) a transmission output shaft rotatably connected to driving wheels, and (3) a plurality of frictional engagement elements selectively engaged and disengaged for switching a plurality of gear shift stages having gear ratios different from one another, each of said gear ratios being obtained by dividing a rotation speed of the input shaft by a rotation speed of the transmission output shaft, the control device configured to control switching operations of an engaged state and a disengaged state of the front clutch and configured to control gear shifting operation of the multi-stage automatic transmission, said control device configured to:

perform a rotation speed control of the engine in a manner in which a rotation speed of the engine output shaft is set to be equal to a next gear shift stage input shaft rotation speed, said next gear shift stage input shaft rotation speed being obtained by multiplying the rotation speed of the transmission output shaft by the gear ratio of the next gear shift stage, when an operation amount of an accelerator pedal increases from an operation amount smaller than a first predetermined amount, at which the engaged state and the disengaged state of the front clutch is switched, to an operation amount greater than a second predetermined amount, at which the gear stages are switched from the current gear shift stage currently established by the multi-stage automatic transmission to the next gear shift stage whose gear ratio is greater than the current gear shift stage, within a priority determining time;

output an engaging command for switching the front clutch from the disengaged state to the engaged state on the basis of a relationship between the rotation speed of the engine output shaft increased by the rotation speed control of the engine and the rotation speed of the rotor of the motor generator;

switch the front clutch from the disengaged state to the engaged state in accordance with the engaging command;

disengage a release side frictional engagement element, which is configured to be engaged when the current gear shift stage is established and configured to be disengaged when the next gear shift stage is established among the plurality of frictional engagement elements, when the operation amount of the accelerator pedal exceeds the second predetermined amount;

perform a rotation speed control of the motor generator to make the rotation speed of the rotor of the motor generator be equal to the next gear shift stage input shaft rotation speed when the release side frictional engagement element is disengaged; and establish an engaged state of an engagement side frictional engagement element, which is configured to be in a disengaged state when the current gear shift stage is established and is configured to be in the engaged state when the next gear shift stage is established among the plurality of the frictional engagement elements, on the basis of a relationship between the rotation speed of the rotor of the motor generator increased by the rotation speed control of the motor generator and the next gearshift stage input shaft rotation speed.

2. The control device for hybrid vehicle drive system according to claim 1, further configured to:

time an elapsed time after the operation amount of the accelerator pedal exceeds the first predetermined amount; wherein when the operation amount of the accelerator pedal exceeds the second predetermined amount before the elapsed time timed by the timer device exceeds the priority determining time, it is determined that the operation amount of the accelerator pedal increases from the operation amount smaller than the first predetermined amount to the operation amount greater than the second predetermined amount within the priority determining time, and it is determined that the priority determining time has elapsed before the operation amount of the accelerator pedal exceeds the second predetermined amount when the elapsed time exceeds the priority determining time before the operation amount of the accelerator pedal exceeds the second predetermined amount.

3. The control device for hybrid vehicle drive system according to claim 1, wherein the engaging command for switching the front clutch from the disengaged state to the engaged state is outputted when a ratio, obtained by dividing the rotation speed of the rotor of the motor generator by the rotation speed of the transmission output shaft, is equal to or greater than a predetermined ratio and when a synchronization completion estimation time, obtained by dividing a current rotation speed difference between the rotation speed of the engine output shaft and the next gear shift stage input shaft rotation speed by a rotation speed incremental gradient of the engine, is equal to or shorter than a minimum time for execution of engagement of the front clutch.

4. The control device for hybrid vehicle drive system according to claim 3, wherein the minimum time for execution of engagement is computed on the basis of a vehicle state including either the rotation speed of the engine output shaft or the rotation speed of the rotor of the motor generator.

5. The control device for hybrid vehicle drive system according to claim 3, wherein the minimum time for execution of engagement is computed on the basis of a vehicle state including a temperature of an operation fluid for the control device.

6. The control device for hybrid vehicle drive system according to claim 1, further configured to:

increase an output of the engine when a maximum time for execution of engagement of the front clutch elapses after the front clutch engagement commanding device outputs the engaging command and when an absolute value of a rotation speed difference between the rotation speed of the rotor of the motor generator and the rotation speed of the engine output shaft is equal to or less than a threshold value.

7. The control device for hybrid vehicle drive system according to claim 6, wherein the maximum time for execution of engagement is computed on the basis of a vehicle state including either the rotation speed of the engine output shaft or the rotation speed of the rotor.

8. The control device for hybrid vehicle drive system according to claim 6, wherein the maximum time for execution of engagement is computed on the basis of a vehicle state including a temperature of an operation fluid for the control device.

9. The control device for hybrid vehicle drive system according to claim 1, wherein the rotation speed control of the engine is performed to make the rotation speed of the engine output shaft be equal to a current gear shift stage input shaft rotation speed, obtained by multiplying the rotation speed of the transmission output shaft by a gear ratio of the current gear shift stage, when the priority determining time elapses before the operation amount of the accelerator pedal exceeds the second predetermined amount;

the engaging command for switching the front clutch from the disengaged state to the engaged state is outputted on the basis of the relationship between the rotation speed of the rotor of the motor generator and the rotation speed of the engine output shaft which is increased to be equal to the current gear shift stage input shaft rotation speed by the rotation speed control of the engine; and the release side frictional engagement element is disengaged after an elapse of a gear shifting delay time after the front clutch engaging device engages the front clutch.

10. The control device for hybrid vehicle drive system according to claim 9, wherein the engaging command for switching the front clutch from the disengaged state to the engaged state is outputted when a synchronization completion estimation time, obtained by dividing a current rotation speed difference between the rotation speed of the engine output shaft and the current gear shift stage input shaft rotation speed by a rotation speed incremental gradient of the engine, is equal to or shorter than a minimum time for execution of engagement of the front clutch.

11. The control device for hybrid vehicle drive system according to claim 9, further configured to:

increase an output of the engine when a maximum time for execution of engagement of the front clutch elapses after the front clutch engagement commanding device outputs the engaging command and when an absolute value of a rotation speed difference between the rotation speed of the rotor of the motor generator and the rotation speed of the engine output shaft is equal to or less than a threshold value; wherein the release side frictional engagement element is disengaged after the elapse of the gear shifting delay time after the output of the engine is increased.

* * * * *